United States Patent
Malloy et al.

(10) Patent No.: US 12,015,563 B2
(45) Date of Patent: *Jun. 18, 2024

(54) MANAGEMENT OF RESOURCE AFFINITIES IN COMPUTING SYSTEMS HAVING MULTIPLE CORES

(71) Applicant: Microsoft Technology Licensing, LLC, Redmond, WA (US)

(72) Inventors: Dmitry Malloy, Redmond, WA (US); Alireza Dabagh, Kirkland, WA (US); Gabriel Silva, Seattle, WA (US); Khoa To, Redmond, WA (US); Omar Cardona, Bellevue, WA (US); Donald Stanwyck, Carnation, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

This patent is subject to a terminal disclaimer.

(21) Appl. No.: 17/033,111

(22) Filed: Sep. 25, 2020

(65) Prior Publication Data
US 2021/0105221 A1    Apr. 8, 2021

Related U.S. Application Data

(63) Continuation of application No. 15/459,256, filed on Mar. 15, 2017, now Pat. No. 10,826,841.
(Continued)

(51) Int. Cl.
*G06F 9/50* (2006.01)
*G06F 9/455* (2018.01)
(Continued)

(52) U.S. Cl.
CPC .......... *H04L 47/627* (2013.01); *G06F 9/5033* (2013.01); *H04L 47/125* (2013.01);
(Continued)

(58) Field of Classification Search
None
See application file for complete search history.

(56) References Cited

U.S. PATENT DOCUMENTS 7,937,499 B1 * 5/2011 Tripathi ............... H04L 49/901
                                                              709/250
9,331,947 B1 * 5/2016 O'Keeffe ................ H04L 47/32
(Continued)

OTHER PUBLICATIONS

"Notice of Allowance Issued in U.S. Appl. No. 16/717,015", dated Nov. 18, 2021, 11 Pages.

*Primary Examiner* — Abu Zar Ghaffari
(74) *Attorney, Agent, or Firm* — Han Gim; Newport IP, LLC

(57) ABSTRACT

Embodiments of network processing resource management in computing devices are disclosed therein. In one embodiment, a method includes receiving a request from a network interface controller to perform network processing operations at a first core of a main processor for packets assigned by the network interface controller to a queue of a virtual port of the network interface controller. The method also includes determining whether the first core has a utilization level higher than a threshold when performing the network processing operations to effect processing and transmission of the packets. If the first core has a utilization level higher than the threshold, the method includes issuing a command to the network interface to modify affinitization of the queue from the first core to a second core having a utilization level lower than the threshold.

19 Claims, 13 Drawing Sheets

Related U.S. Application Data

(60) Provisional application No. 62/430,485, filed on Dec. 6, 2016.

(51) Int. Cl.
  *H04L 47/125* (2022.01)
  *H04L 47/625* (2022.01)
  *H04L 49/90* (2022.01)

(52) U.S. Cl.
  CPC ........ *G06F 9/45558* (2013.01); *G06F 9/5077* (2013.01); *H04L 49/90* (2013.01)

(56) References Cited

U.S. PATENT DOCUMENTS

| | | | |
|---|---|---|---|
| 9,396,026 B2 * | 7/2016 | Ichikawa | G06F 9/4881 |
| 10,095,543 B1 * | 10/2018 | Griffin | G06F 12/128 |
| 2002/0062454 A1 * | 5/2002 | Fung | G06F 3/0689 |
| | | | 713/300 |
| 2007/0014276 A1 * | 1/2007 | Bettink | H04L 45/00 |
| | | | 370/351 |
| 2009/0007150 A1 | 1/2009 | Li et al. | |
| 2009/0031317 A1 * | 1/2009 | Gopalan | G06F 9/5033 |
| | | | 718/103 |
| 2010/0157830 A1 * | 6/2010 | Yazaki | H04L 41/0896 |
| | | | 713/320 |
| 2012/0014265 A1 * | 1/2012 | Schlansker | H04L 43/18 |
| | | | 370/252 |
| 2012/0033673 A1 | 2/2012 | Goel et al. | |
| 2012/0278637 A1 * | 11/2012 | Hsin | G06F 1/3203 |
| | | | 713/300 |
| 2014/0198652 A1 * | 7/2014 | Dalal | G06F 12/1081 |
| | | | 370/235 |
| 2014/0198653 A1 * | 7/2014 | Dalal | H04L 67/10 |
| | | | 370/235 |
| 2014/0269288 A1 * | 9/2014 | Crisan | H04L 47/2425 |
| | | | 370/231 |
| 2015/0058842 A1 * | 2/2015 | Chen | G06F 9/45558 |
| | | | 718/1 |
| 2015/0261556 A1 * | 9/2015 | Jain | H04L 49/70 |
| | | | 718/1 |
| 2015/0263968 A1 * | 9/2015 | Jain | G06F 9/00 |
| | | | 370/235 |
| 2015/0281346 A1 * | 10/2015 | Emaru | G06F 9/4856 |
| | | | 709/203 |
| 2015/0295830 A1 * | 10/2015 | Talla | H04L 49/901 |
| | | | 370/235 |
| 2016/0006687 A1 * | 1/2016 | Tsirkin | H04L 49/90 |
| | | | 370/392 |
| 2016/0057014 A1 * | 2/2016 | Thakkar | G06F 9/45558 |
| | | | 709/223 |
| 2016/0057056 A1 * | 2/2016 | Gasparakis | H04L 45/74 |
| | | | 370/392 |
| 2016/0117186 A1 * | 4/2016 | Soundararajan | G06F 9/5088 |
| | | | 718/1 |
| 2016/0182379 A1 | 6/2016 | Mehra et al. | |
| 2017/0005931 A1 * | 1/2017 | Mehta | H04L 49/90 |
| 2017/0126345 A1 * | 5/2017 | Testicioglu | H04J 3/0658 |
| 2017/0206118 A1 * | 7/2017 | Therien | G06F 9/5033 |
| 2020/0127922 A1 | 4/2020 | Malloy et al. | |

\* cited by examiner

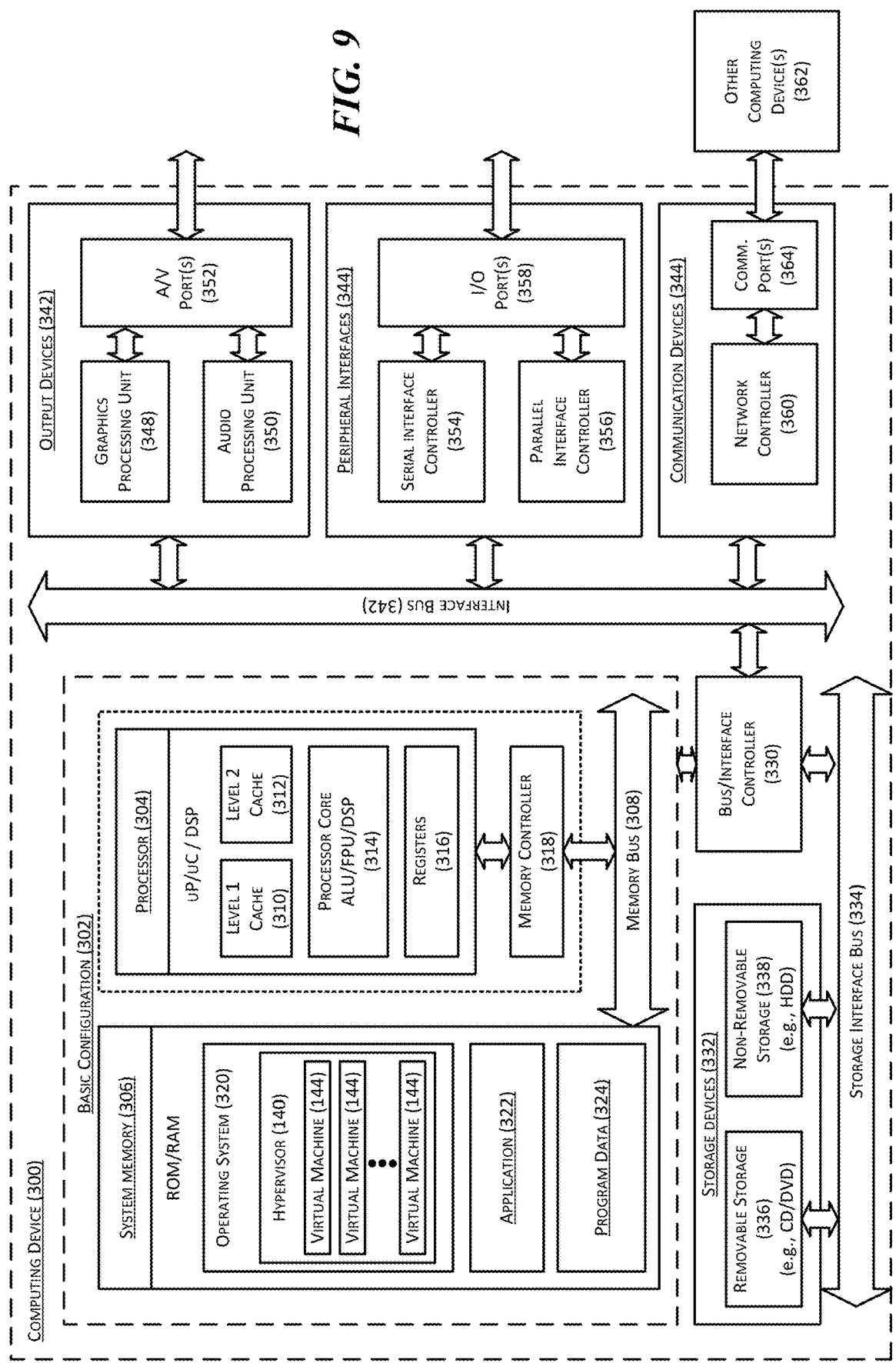

MANAGEMENT OF RESOURCE AFFINITIES IN COMPUTING SYSTEMS HAVING MULTIPLE CORES

CROSS-REFERENCE TO RELATED APPLICATION(S)

This application is a continuation of and claims priority to U.S. patent application Ser. No. 15/459,256, filed Mar. 15, 2017, which is a non-provisional application of and claims priority to U.S. Provisional Application No. 62/430,485, filed on Dec. 6, 2016.

BACKGROUND

Remote or "cloud" computing typically utilizes a collection of remote servers in datacenters to provide computing, data storage, electronic communications, or other cloud services. The remote servers can be interconnected by computer networks to form one or more computing clusters. During operation, multiple remote servers or computing clusters can cooperate to provide a distributed computing environment that facilitates execution of user applications to provide cloud services.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Servers in datacenters typically include a main processor with multiple "cores" that can operate independently, in parallel, or in other suitable manners to execute instructions. To facilitate communications with one another or with external devices, individual servers can also include a network interface controller ("NIC") for interfacing with a computer network. A NIC typically includes hardware circuitry and/or firmware configured to enable communications between servers by transmitting/receiving data (e.g., as packets) via a network medium according to Ethernet, Fibre Channel, Wi-Fi, or other suitable physical and/or data link layer standards.

During operation, one or more cores of a processor in a server can cooperate with the NIC to facilitate communications to/from software components executing on the server. Example software components can include virtual machines, applications executing on the virtual machines, a hypervisor for hosting the virtual machines, or other suitable types of components. To facilitate communications to/from the software components, the one or more cores can execute suitable network processing operations to enforce communications security, perform network virtualization, translate network addresses, maintain a communication flow state, or perform other suitable functions.

One challenge for improving throughput to the software components on a server is to overcome limited processing capacities of the cores. During operation, executing network processing operations can overload the cores and thus render the cores as communications bottlenecks. A single core is typically used for executing network processing operations for a particular communication flow in order to maintain a proper communication flow state such as a proper sequence of transmitted packets. As available throughput of the NIC increases, a single core can become inadequate for executing network processing operations to accommodate operations of the NIC. As such, processing capabilities of the cores can limit transmission rates of data to/from software components on the server.

Embodiments of the disclosed technology can address certain aspects of the foregoing challenge by implementing multi-stage network processing load balancing in a server having a NIC operatively coupled to multiple cores. In certain embodiments, the NIC can be configured to implement a two-stage network processing load balancing by having hardware electronic circuitry configured to provide (i) a first stage with a port selector configured to select a virtual port; and (ii) a serially coupled second stage with a receive side scaling ("RSS") engine configured to further distribute network processing loads. Examples of such hardware electronic circuitry can include an application-specific integrated circuit ("ASIC"), a field programmable gate array ("FPGA") with suitable firmware, or other suitable hardware components. A virtual port in a NIC is a virtual network interface corresponding to a hypervisor, a virtual machine, or other components hosted on a server. A virtual port can include one or more virtual channels (e.g., as queues) individually having an assigned core to accommodate network processing load associated with one or more communication flows (e.g., TCP/UDP flows) such as an exchange of data during a communication session between two applications on separate servers.

In certain implementations, at the first stage, the port selector can be configured to distribute incoming packets to a particular virtual port of the NIC based on a general destination of the incoming packets (e.g., a virtual machine). In one example, the port selector can be configured to filter the incoming packets based on a media access control address ("MAC" address) or a combination of a MAC address and a virtual network tag included in headers of the packets. The filtered packets associated with a particular MAC address are then assigned to a virtual port associated with a virtual machine on the server. In other implementations, the port selector can be configured to filter the incoming packets based on a virtual machine identifier, a virtual machine IP address, or other suitable identifiers.

At the second stage, the RSS engine can be configured to further distribute the incoming packets assigned to a virtual port to multiple queues in the virtual port based on a particular destination of the packets (e.g., an application executing on the virtual machine). For example, in one implementation, the RSS engine can be configured to calculate a hash value (e.g., 32 bits) based on a source IP address, a destination IP address, a source port, a destination port, and/or other suitable Transmission Control Protocol ("TCP") parameters (referred to as "characteristic of communication") of the packets. The RSS engine can then assign the packets to a queue in the virtual port based on one or more bits of the calculated hash value by consulting an indirection table associated with the virtual port. The indirection table contains assignments of individual queues with an affinitized or associated core based on the one or more bits of the hash value. With the identified queue/core, the NIC can then cooperate with the identified core to forward the packets to the particular destination on the server.

Several embodiments of the disclosed technology can improve network data throughput to applications, virtual machines, or other software components on a server when compared to other communication techniques. In certain computing systems, RSS operations can be implemented as a software component, for example, a module of an operating system executed by a core on the server. However, using a generic main processor for performing RSS operations such as hash calculations can be highly inefficient. For instance, in one test, a server having software implemented RSS engine could only achieve about 26 Gbit/s of network data transmission when the NIC has a capacity of 40 Gbit/s. The software implemented RSS engine can also suffer from performance jitters or variances when the core experiences operational delays and other undesirable effects. By offloading execution of RSS operations to the hardware implemented RSS engine in the NIC, data throughput in the server can be significantly improved. For instance, in another test, a server having a hardware implemented RSS engine achieved close to 40 Gbit/s of network data transmission when the NIC has a capacity of 40 Gbit/s.

In other embodiments, a server having a NIC configured to implement the two-stage balancing described above can also include a software module (referred to below as "load balancer") configured to dynamically balance network processing loads on the multiple cores by modifying core assignments for corresponding queues based on current loads of the cores. For example, the load balancer can be configured to monitor a current network processing loads of the cores and compare the current loads with a high threshold value. In response to determining that a current network processing load of a core exceeds the high threshold value, the load balancer can modify one or more entries of affinitization or association between a queue and a core in the indirection table of the NIC. The load balancer can also modify one or more affinitization in the indirection table to combine network processing loads when one or more current loads of the corresponding cores are less than a low threshold. In further examples, the load balancer can also be configured to balance the networking processing loads in suitable manners such that a minimal number of cores are used for network processing loads. By reducing or limiting the number of cores used for network processing, power consumption in the server can be reduced.

BRIEF DESCRIPTION OF THE DRAWINGS

FIG. 3A is a schematic block diagram of a host suitable for the computing system of FIG. 1 at operational stages during network data processing in accordance with embodiments of the present technology FIG. 3B is a schematic block diagram of a host suitable for the computing system of FIG. 1 at operational stages during network data processing in accordance with embodiments of the present technology, and showing operations of the load balancer.

FIG. 3C is a schematic block diagram of a host suitable for the computing system of FIG. 1 at operational stages during network data processing in accordance with embodiments of the present technology, and showing operational stages related to coalescing network processing loads.

FIG. 3D is a schematic block diagram of a host suitable for the computing system of FIG. 1 at operational stages during network data processing in accordance with embodiments of the present technology, and showing virtual machines configured to execute multiple applications.

FIG. 3E is a schematic block diagram of a host suitable for the computing system of FIG. 1 at operational stages during network data processing in accordance with embodiments of the present technology, and showing queues for receiving packets.

FIG. 3F is a schematic block diagram of a host suitable for the computing system of FIG. 1 at operational stages during network data processing in accordance with embodiments of the present technology, and showing a third core executing network processing loads.

FIG. 8A is a flow diagram illustrating aspects of processes for network processing resource management in a host in accordance with embodiments of the present technology.

FIG. 8B is a flow diagram illustrating aspects of processes for network processing resource management in a host in accordance with embodiments of the present technology, and showing a request to process packets in a queue of a virtual port of a network interface.

FIG. 8C is a flow diagram illustrating aspects of processes for network processing resource management in a host in accordance with embodiments of the present technology, and showing processor or core operating parameters.

FIG. 8D is a flow diagram illustrating aspects of processes for network processing resource management in a host in accordance with embodiments of the present technology, and showing a modification command.

FIG. 9 is a computing device suitable for certain components of the computing system in FIG. 1.

DETAILED DESCRIPTION

Figure 1:
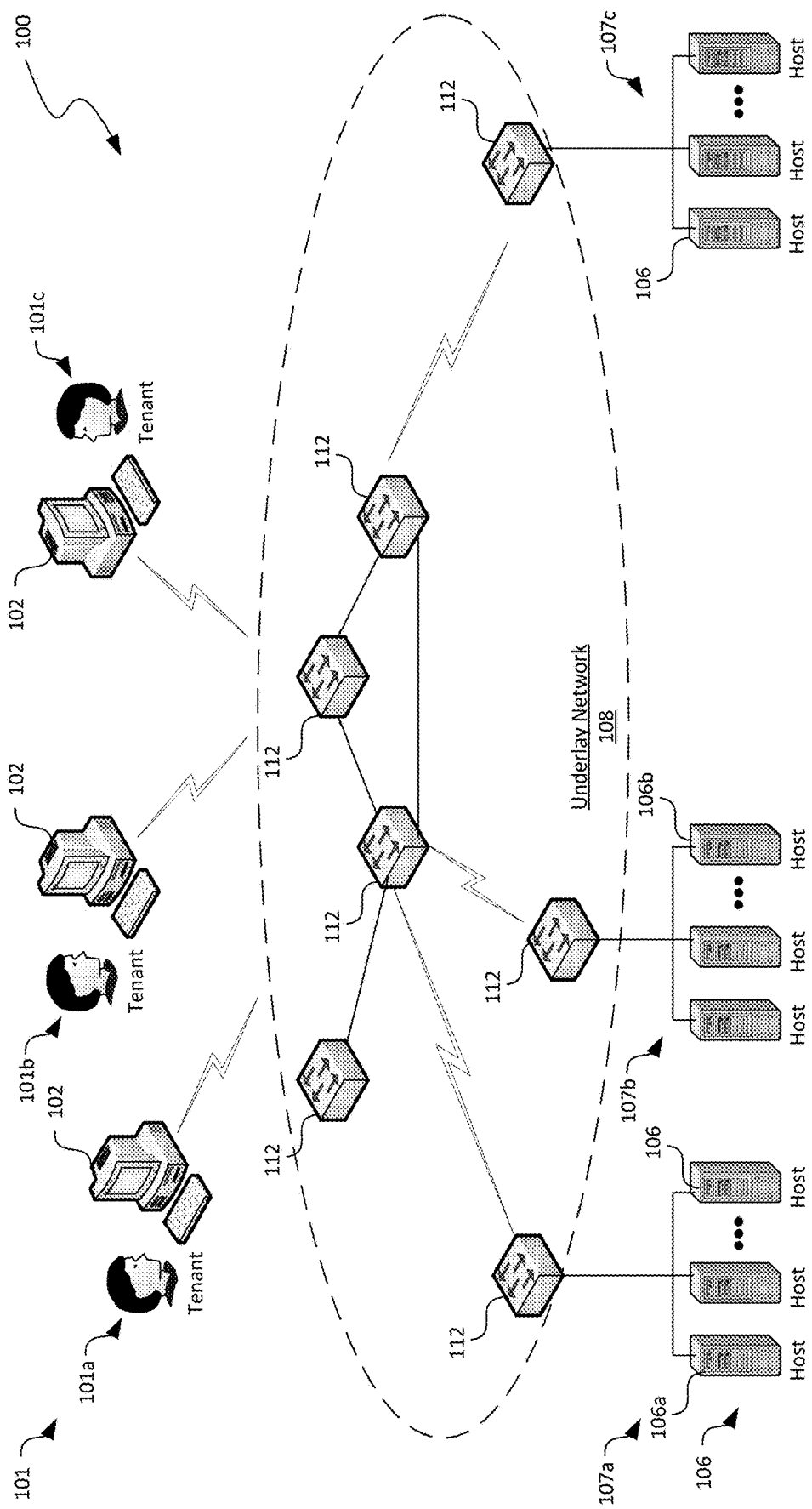
FIG. 1 is a schematic diagram illustrating a computing system having hosts implementing network traffic management techniques in accordance with embodiments of the disclosed technology.

Various embodiments of computing systems, devices, components, modules, routines, and processes related to network traffic management in computing devices and systems are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1-9.

As used herein, the term "computing system" generally refers to an interconnected computer network having a plurality of network devices that interconnect a plurality of servers or hosts to one another or to external networks (e.g., the Internet). The term "network device" generally refers to a physical network device, examples of which include routers, switches, hubs, bridges, load balancers, security gateways, or firewalls. A "host" generally refers to a computing device configured to implement, for instance, one or more virtual machines or other suitable virtualized components. For example, a host can include a server having a hypervisor configured to support one or more virtual machines or other suitable types of virtual components.

A computer network can be conceptually divided into an overlay network implemented over an underlay network. An "overlay network" generally refers to an abstracted network implemented over and operating on top of an underlay network. The underlay network can include multiple physical network devices interconnected with one another. An overlay network can include one or more virtual networks. A "virtual network" generally refers to an abstraction of a portion of the underlay network in the overlay network. A virtual network can include one or more virtual end points referred to as "tenant sites" individually used by a user or "tenant" to access the virtual network and associated computing, storage, or other suitable resources. A tenant site can have one or more tenant end points ("TEPs"), for example, virtual machines. The virtual networks can interconnect multiple TEPs on different hosts. Virtual network devices in the overlay network can be connected to one another by virtual links individually corresponding to one or more network routes along one or more physical network devices in the underlay network.

Also used herein, a "packet" generally refers to a formatted unit of data carried by a packet-switched or other suitable types of network. A packet typically includes both control information and user data referred to as payload. Control information can provide data for transmitting or delivering a payload. For example, control information can include source and destination network addresses, error detection codes (e.g., CRC codes), sequencing information, and/or other suitable data. Typically, control information can be contained in packet headers that precede the payload and trailers that follow the payload. An example header is described below with reference to FIG. 4.

A "virtual port" generally refers to a virtual network interface on a NIC that corresponds to a hypervisor, a virtual machine, or other components hosted on a computing device. A virtual port can include one or more virtual channels (e.g., as queues) that can be assigned to packets associated with a single communication flow. Each queue can be affinitized with a single core of a main processor in the server. The term "affinitize" generally refers to an assignment, designation, or association for establishing a relationship between a queue in a virtual port with a single core in the main processor in the server.

Servers in datacenters typically include a main processor with multiple cores to execute instructions independently, cooperatively, or in other suitable manners. The servers can also include a NIC for interfacing with a computer network. The NIC can facilitate, for example, transmission and reception of packets via a network medium according to Ethernet, Fibre Channel, Wi-Fi, or other suitable standards. During operation, one or more cores in a server can cooperate with the NIC to facilitate communications via the computer network. The core can execute instructions to enforce communications security, perform network virtualization, translate network addresses, maintaining a communication flow state, or perform other suitable functions.

One challenge for improving throughput to virtual machines or applications executing in the virtual machines on a server is that the cores can be overloaded with executing the network processing operations or loads and become communications bottlenecks. Typically, a single core is used for executing network processing loads for a communication flow to maintain a proper communication flow state, e.g., a proper sequence of transmitted packets. As available throughput of the NIC increases, a single core can have inadequate processing capability to execute the network processing loads to accommodate the throughput of the NIC. As such, processing capabilities of the cores can limit transmission rates of network data to/from applications, virtual machines, or other software components executing on the servers.

Several embodiments of the disclosed technology can address certain aspects of the foregoing challenge by implementing multi-stage network processing load balancing in a server having a NIC operatively coupled to multiple cores of a processor in a server. In certain embodiments, the NIC can be configured to implement two-stage hardware network processing load balancing by having (i) a first stage with a port selector and, in series with the first stage, (ii) a second stage with a receive side scaling ("RSS") engine. At the first stage, the port selector can be configured to distribute incoming packets to a particular virtual port of the NIC based on MAC addresses of the incoming packets. At the second stage, the RSS engine can be configured to further distribute the incoming packets assigned to a virtual port to multiple queues in the virtual port based on characteristic of communication of the packets. With the identified queue/core, the NIC can then cooperate with the identified core to forward the packets to suitable applications, virtual machines, or other software components on the server.

The network processing loads can be further distributed or coalesced by utilizing a software implemented load balancer. The load balancer can be configured to dynamically balance network processing loads on the multiple cores by modifying core affinitization of queues based on current network processing loads of the cores. For example, the load balancer can be configured to monitor a current network processing loads of the cores and compare the current loads with a high threshold value. In response to determining that a current network processing load of a core exceeds the high threshold value, the load balancer can "relocate" network processing load of a particular queue to a new core. In other examples, the load balancer can also be configured to combine network processing loads when one or more current loads of the corresponding cores are less than a low threshold. As such, the load balancer can balance networking processing loads on a number of cores such that a minimal number of cores are used for network processing loads. By reducing or limiting the number of cores used for network processing, power consumption in the server can be reduced, as described in more detail below with reference to FIGS. 1-9.

FIG. 1 is a schematic diagram illustrating a computing system 100 having hosts implementing network traffic management techniques in accordance with embodiments of the disclosed technology. As shown in FIG. 1, the computing system 100 can include an underlay network 108 interconnecting a plurality of hosts 106, a plurality of client devices 102 of tenants 101 to one another. Even though particular components of the computing system 100 are shown in FIG. 1, in other embodiments, the computing system 100 can also include network storage devices, maintenance managers, and/or other suitable components (not shown) in addition to or in lieu of the components shown in FIG. 1.

As shown in FIG. 1, the underlay network 108 can include multiple network devices 112 that interconnect the multiple hosts 106 and the client devices 102. In certain embodiments, the hosts 106 can be organized into racks, action zones, groups, sets, or other suitable divisions. For example, in the illustrated embodiment, the hosts 106 are grouped into three host sets identified individually as first, second, and third host sets 107a-107c. In the illustrated embodiment, each of the host sets 107a-107c is operatively coupled to corresponding network devices 112a-112c, respectively, which are commonly referred to as "top-of-rack" or "TOR" network devices. The TOR network devices 112a-112c can then be operatively coupled to additional network devices 112 to form a computer network in a hierarchical, flat, mesh, or other suitable types of topology. The computer network can allow communications among the hosts 106 and the client devices 102. In other embodiments, the multiple host sets 107a-107c can share a single network device 112 or can have other suitable arrangements.

The hosts 106 can individually be configured to provide computing, storage, and/or other suitable cloud computing services to the individual tenants 101. For example, as described in more detail below with reference to FIG. 2, each of the hosts 106 can initiate and maintain one or more virtual machines 144 (shown in FIG. 2) upon requests from the tenants 101. The tenants 101 can then utilize the instantiated virtual machines 144 to perform computation, communication, and/or other suitable tasks. In certain embodiments, one of the hosts 106 can provide virtual machines 144 for multiple tenants 101. For example, the host 106a can host three virtual machines 144 individually corresponding to each of the tenants 101a-101c. In other embodiments, multiple hosts 106 can host virtual machines 144 for the tenants 101a-101c.

The client devices 102 can each include a computing device that facilitates corresponding users 101 to access cloud services provided by the hosts 106 via the underlay network 108. For example, in the illustrated embodiment, the client devices 102 individually include a desktop computer. In other embodiments, the client devices 102 can also include laptop computers, tablet computers, smartphones, or other suitable computing devices. Even though three users 101 are shown in FIG. 1 for illustration purposes, in other embodiments, the distributed computing system 100 can facilitate any suitable number of users 101 to access cloud or other suitable types of computing services provided by the hosts 106.

Figure 2:
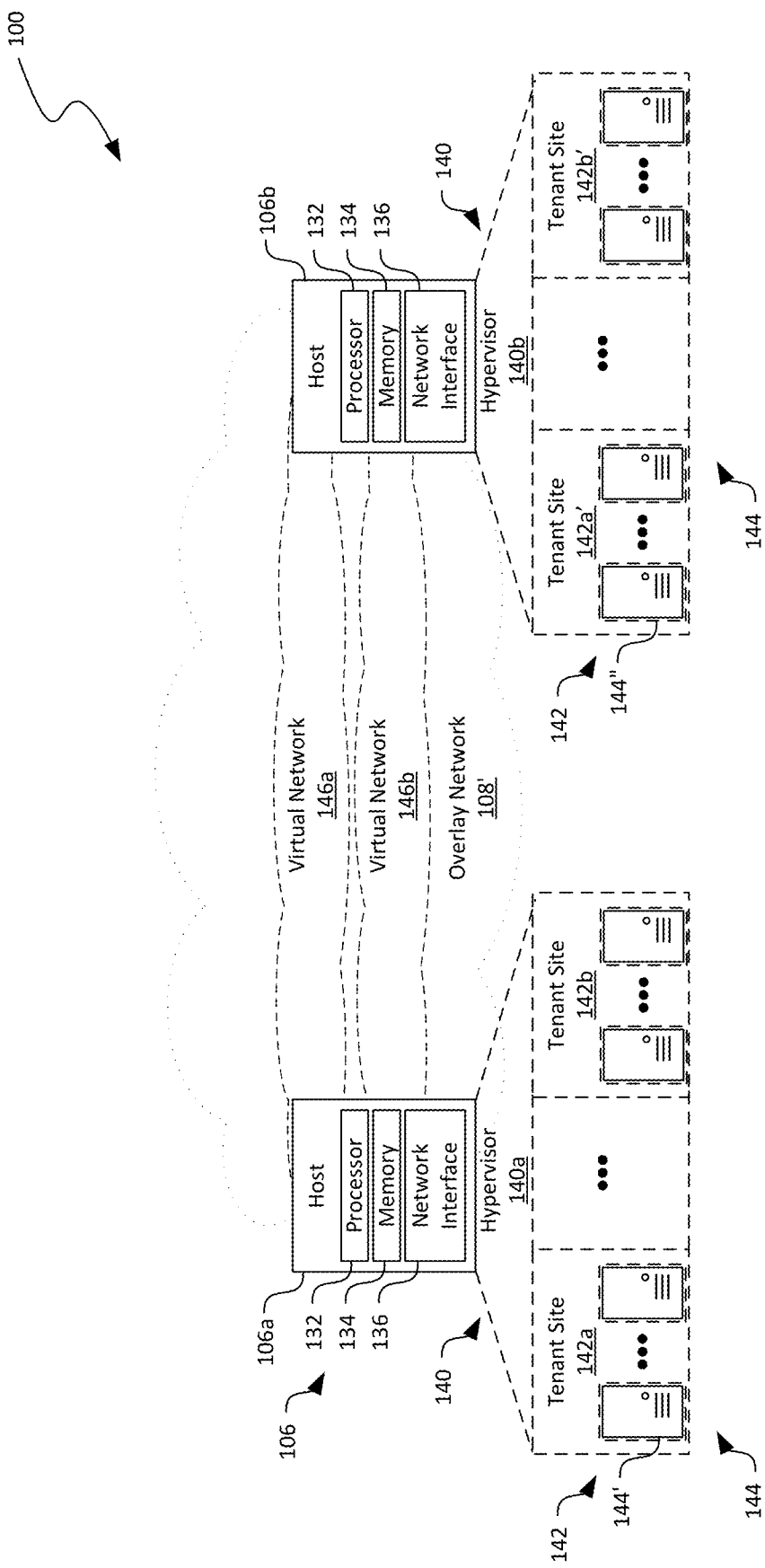
FIG. 2 is a schematic diagram illustrating certain hardware/software components of the computing system of FIG. 1 in accordance with embodiments of the disclosed technology.

FIG. 2 is a schematic diagram illustrating an overlay network 108' implemented on the underlay network 108 in FIG. 1 in accordance with embodiments of the disclosed technology. In FIG. 2, only certain components of the underlay network 108 of FIG. 1 are shown for clarity. As shown in FIG. 2, the first host 106a and the second host 106b can each include a processor 132, a memory 134, and a network interface 136 operatively coupled to one another. The processor 132 can include one or more microprocessors, field-programmable gate arrays, and/or other suitable logic devices. The memory 134 can include volatile and/or non-volatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIG. 8A-8D). The network interface 136 can include a NIC, a connection converter, and/or other suitable types of input/output devices configured to accept input from and provide output to other components on the virtual networks 146.

The first host 106a and the second host 106b can individually contain instructions in the memory 134 executable by the processors 132 to cause the individual processors 132 to provide a hypervisor 140 (identified individually as first and second hypervisors 140a and 140b). The hypervisors 140 can be individually configured to generate, monitor, terminate, and/or otherwise manage one or more virtual machines 144 organized into tenant sites 142. For example, as shown in FIG. 2, the first host 106a can provide a first hypervisor 140a that manages first and second tenant sites 142a and 142b, respectively. The second host 106b can provide a second hypervisor 140b that manages first and second tenant sites 142a' and 142b', respectively. The hypervisors 140 are individually shown in FIG. 2 as a software component. However, in other embodiments, the hypervisors 140 can also include firmware and/or hardware components. The tenant sites 142 can each include multiple virtual machines 144 for a particular tenant 101 (FIG. 1). For example, the first host 106a and the second host 106b can both host the tenant site 142a and 142a' for a first tenant 101a (FIG. 1). The first host 106a and the second host 106b can both host the tenant site 142b and 142b' for a second tenant 101b (FIG. 1). Each virtual machine 144 can be executing a corresponding operating system, middleware, and/or suitable applications. The executed applications can each correspond to one or more cloud computing services or other suitable types of computing services.

Also shown in FIG. 2, the computing system 100 can include an overlay network 108' having one or more virtual networks 146 that interconnect the tenant sites 142a and 142b across the first and second hosts 106a and 106b. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks (not shown) may be configured to correspond to a single tenant site 146.

The virtual machines 144 on the virtual networks 146 can communicate with one another via the underlay network 108 (FIG. 1) even though the virtual machines 144 are located or hosted on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machine 144 in a particular virtual network 146. Thus, different virtual networks 146 can use one or more virtual network addresses that are the same. Example virtual network addresses can include IP addresses, MAC addresses, and/or other suitable addresses.

In operation, the hosts 106 can facilitate communications among the virtual machines and/or applications executing in the virtual machines 144. For example, the processor 132 can execute suitable network communication operations to facilitate the first virtual machine 144' to transmit packets to the second virtual machine 144" via the virtual network 146a by traversing the network interface 136 on the first host 106a, the underlay network 108 (FIG. 1), and the network interface 136 on the second host 106b. In accordance with embodiments of the disclosed technology, the network interfaces 136 can be implemented with multi-stage network processing load balancing to improve throughput to the virtual machines 144 and/or applications (not shown) executing in the virtual machines 144, as described in more detail below with reference to FIGS. 3A-3F.

Figure 3A:
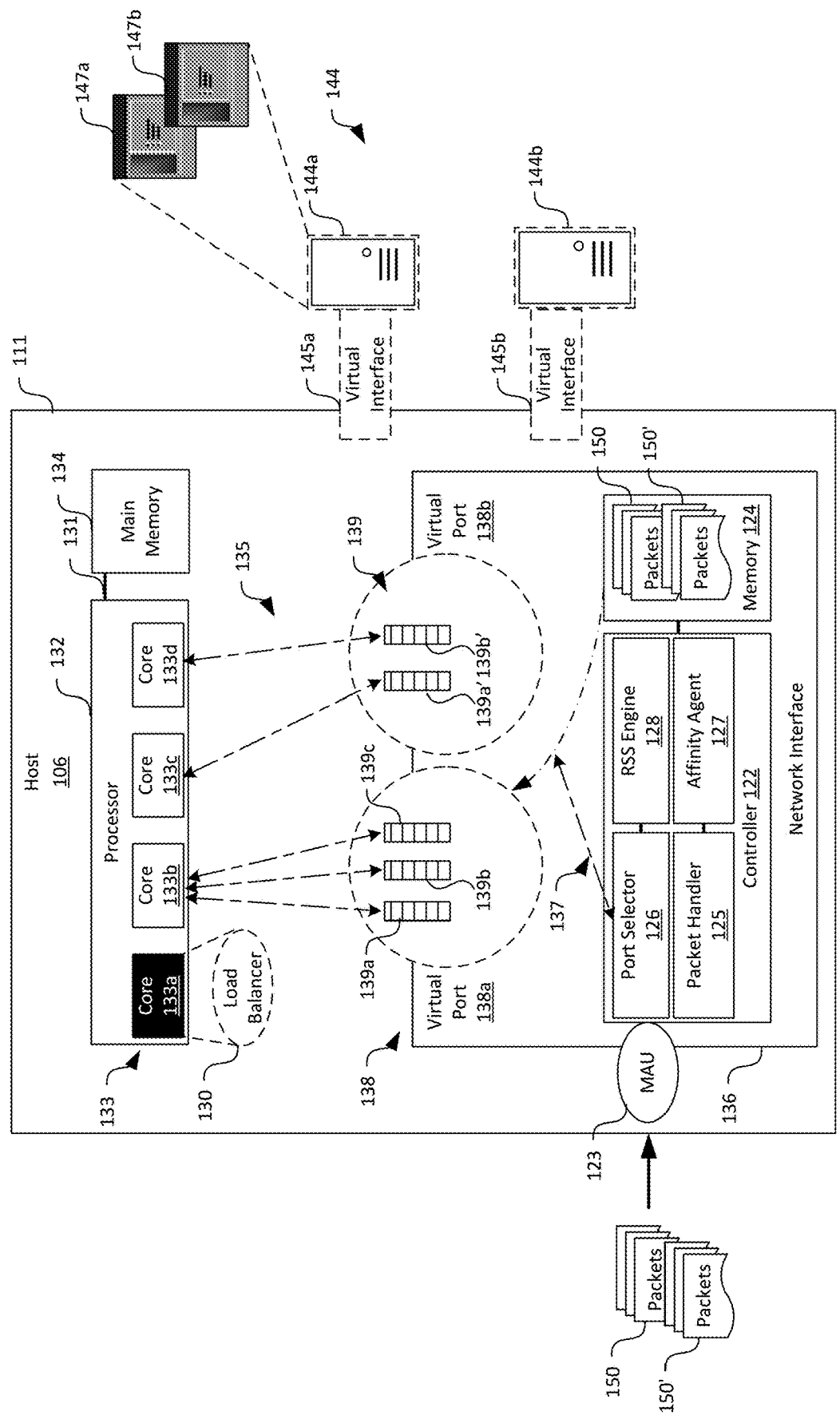
FIGS. 3A-3F are schematic block diagrams of a host suitable for the computing system of FIG. 1 at operational stages during network data processing in accordance with embodiments of the present technology.
Figure 3B:
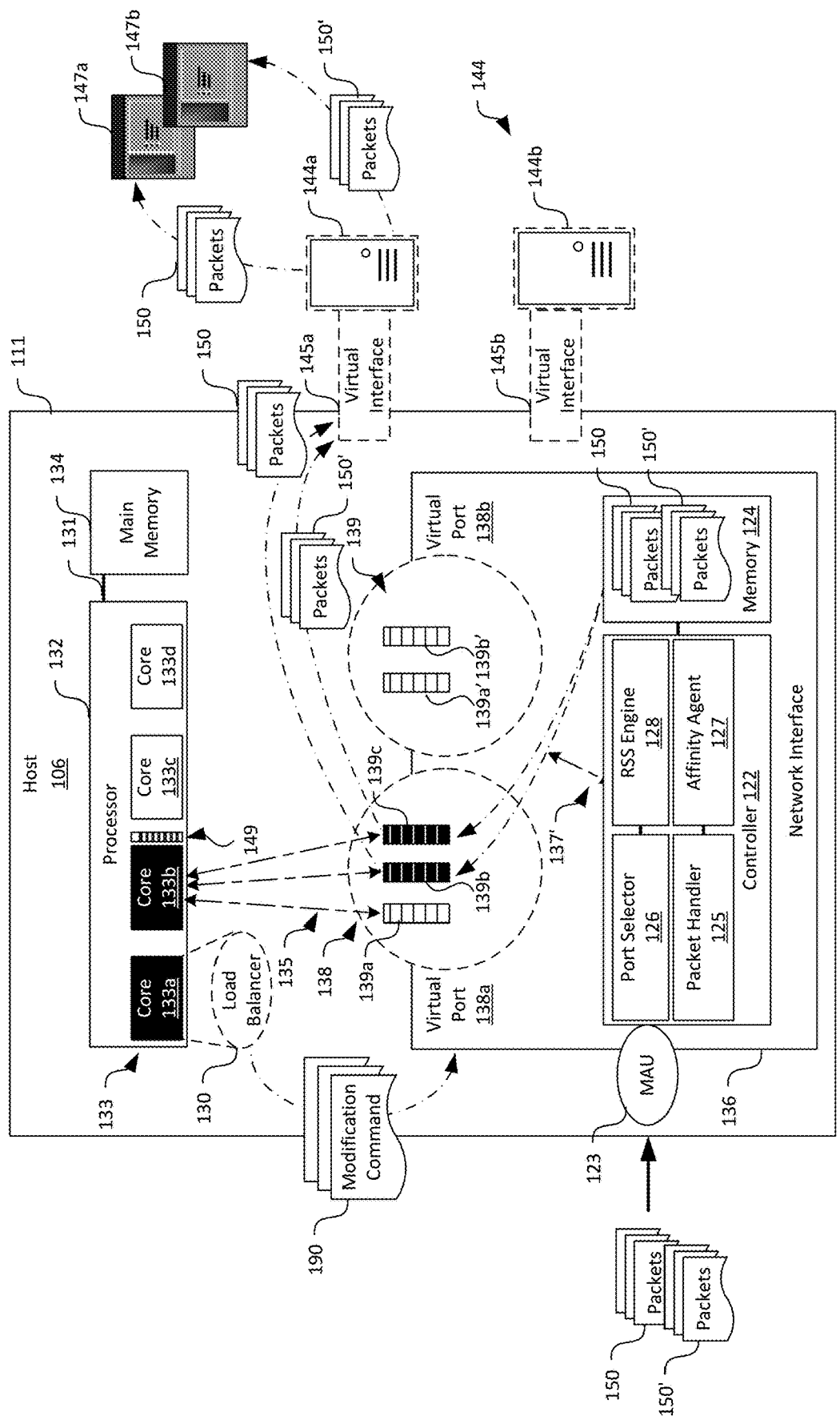
Figure 3C:
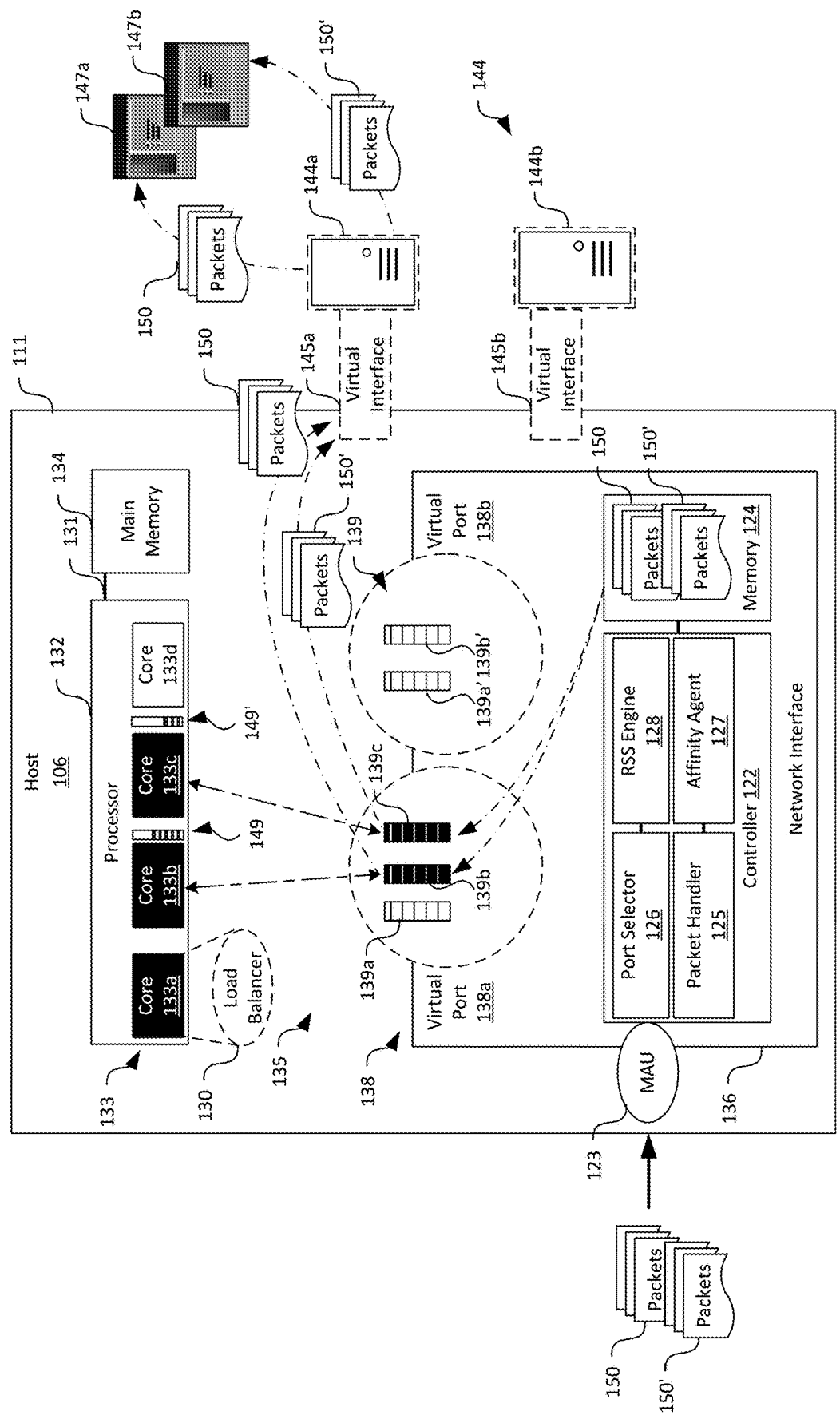
Figure 3D:
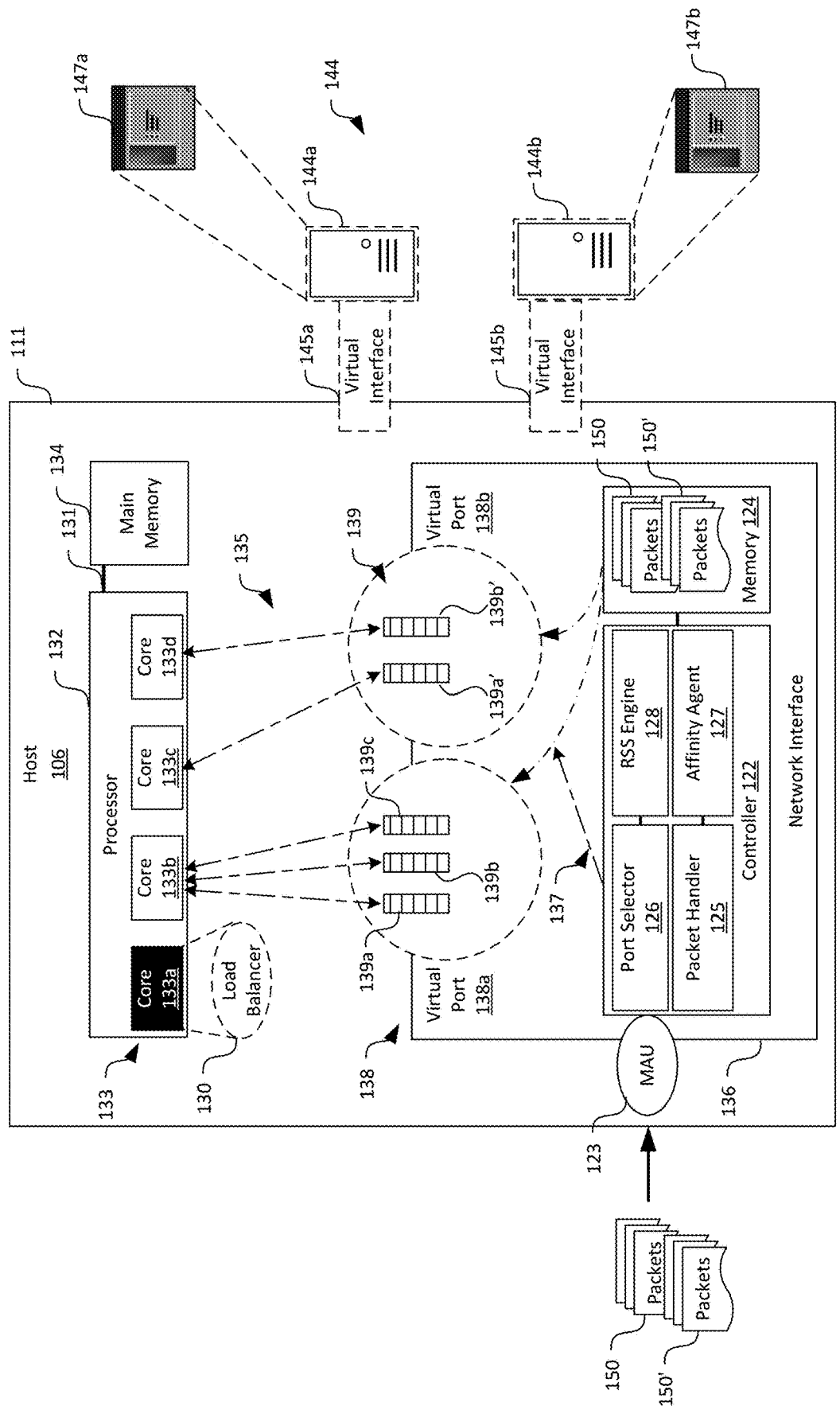

FIGS. 3A-3F are schematic block diagrams of a host 106 suitable for the computing system 100 of FIG. 1 at various operational stages during network data processing in accordance with embodiments of the present technology. In particular, FIGS. 3A-3C illustrate operational stages related to distribution of network processing loads to additional core(s) for multiple communication flows. As used herein, a "communication flow" generally refers to a sequence of packets from a source (e.g., an application or a virtual machine executing on a host) to a destination, which can be another application or virtual machine executing on another host, a multicast group, or a broadcast domain. FIGS. 3C-3F illustrate operational stages related to coalescing network processing loads to one or more cores for multiple for multiple communication flows. Though particular components of the host 106 are described below, in other embodiments, the host 106 can also include additional and/or different components in lieu of or in additional to those shown in FIGS. 3A-3F. Details of the various operational stages are described below in turn.

In FIGS. 3A-3F and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may also include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component, and a third component. The foregoing components can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a tablet computer, a network server, a laptop computer, a smartphone, and/or other suitable computing devices.

Equally, components may include hardware circuitry. In certain examples, hardware may be considered fossilized software, and software may be considered liquefied hardware. As just one example, software instructions in a component may be burned to a Programmable Logic Array circuit, or may be designed as a hardware component with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media. As used herein, the term "computer readable storage media" excludes propagated signals.

As shown in FIG. 3A, the host 106 can include a motherboard 111 carrying a processor 132, a main memory 134, and a network interface 135 operatively coupled to one another. Though not shown in FIGS. 3A-3F, in other embodiments, the host 106 can also include a memory controller, a persistent storage, an auxiliary power source, a baseboard management controller operatively coupled to one another. In certain embodiments, the motherboard 111 can include a printed circuit board with one or more sockets configured to receive the foregoing or other suitable components described herein. In other embodiments, the motherboard 111 can also carry indicators (e.g., light emitting diodes), platform controller hubs, complex programmable logic devices, and/or other suitable mechanical and/or electric components in lieu of or in addition to the components shown in FIGS. 3A-3F.

The processor 132 can be an electronic package containing various components configured to perform arithmetic, logical, control, and/or input/output operations. The processor 132 can be configured to execute instructions to provide suitable computing services, for example, in response to a user request received from the client device 102 (FIG. 1). As shown in FIG. 3A, the processor 132 can include one or more "cores" 133 configured to execute instructions independently or in other suitable manners. Four cores 133 (illustrated individually as first, second, third, and fourth cores 133a-133d, respectively) are shown in FIG. 3A for illustration purposes. In other embodiments, the processor 132 can include eight, sixteen, or any other suitable number of cores 133. The cores 133 can individually include one or more arithmetic logic units, floating-point units, L1 and L2 cache, and/or other suitable components. Though not shown in FIG. 3A, the processor 132 can also include one or more peripheral components configured to facilitate operations of the cores 133. The peripheral components can include, for example, QuickPath® Interconnect controllers, L3 cache, snoop agent pipeline, and/or other suitable elements.

The main memory 134 can include a digital storage circuit directly accessible by the processor 132 via, for example, a data bus 131. In one embodiment, the data bus 131 can include an inter-integrated circuit bus or I²C bus as detailed by NXP Semiconductors N.V. of Eindhoven, the Netherlands. In other embodiments, the data bus 131 can also include a PCIe bus, system management bus, RS-232, small computer system interface bus, or other suitable types of control and/or communications bus. In certain embodiments, the main memory 134 can include one or more DRAM modules. In other embodiments, the main memory 134 can also include magnetic core memory or other suitable types of memory.

As shown in FIG. 3A, the processor 132 can cooperate with the main memory 134 to execute suitable instructions to provide one or more virtual machines 144. In FIG. 3A, two virtual machines 144 (illustrated as first and second virtual machines 144a and 144b, respectively) are shown for illustration purposes. In other embodiments, the host 106 can be configured to provide one, three, four, or any other suitable number of virtual machines 144. The individual virtual machines 144 can be accessible to the tenants 101 (FIG. 1) via the overlay and underlay network 108' and 108 (FIGS. 1 and 2) for executing suitable user operations. For example, as shown in FIG. 3A, the first virtual machine 144a can be configured to execute applications 147 (illustrated as first and second applications 147a and 147b, respectively) for one or more of the tenants 101 in FIG. 1. In other examples, the individual virtual machines 144 can be configured to execute multiple applications 147, as described in more detail below with respect to FIGS. 3D-3F.

The individual virtual machines 144 can include a corresponding virtual interface 145 (identified as first virtual interface 145*a* and second virtual interface 145*b*) for receiving/transmitting data packets via the virtual network 108'. In certain embodiments, the virtual interfaces 145 can each be a virtualized representation of resources at the network interface 136 (or portions thereof). For example, the virtual interfaces 145 can each include a virtual Ethernet or other suitable types of interface that shares physical resources at the network interface 136. Even though only one virtual interface 145 is shown for each virtual machine 144, in further embodiments, a single virtual machine 144 can include multiple virtual interfaces 145 (not shown).

As shown in FIG. 3A, the processor 132 can cooperate with the main memory 134 to execute suitable instructions to provide a load balancer 130. In the illustrated embodiment, the first core 133*a* is shown as executing and providing the load balancer 130. In other embodiments, other suitable core(s) 133 can also be tasked with executing suitable instructions to provide the load balancer 130. In certain embodiments, the load balancer 130 can be configured to monitor status of network processing loads on the cores 133 and dynamically re-affinitize or re-assign cores for executing network processing loads for particular queues 139.

In one embodiment, the load balancer 130 can be configured to distribute network processing loads currently carried by a particular core 133 to multiple cores 133. For example, the load balancer 133 can receive and compare a current utilization value (e.g., a percentage or fraction) of a core 133 with a high threshold (e.g., 90% or 95%). If the current utilization value of the core 133 exceeds the high threshold instantaneously or over a preset period, the load balancer 130 can be configured to determine (i) which queue(s) 139 (or associated communication flows) can be relocated from the current core 133; and (ii) whether another new core 133 has capacity to assume responsibility for executing network processing loads associated with the queue(s) 139. In some implementations, the new core 133 can be selected based on processor cache-proximity to either the current core 133, or a "preferred" core 133 that is selected based on performance considerations. For example, the preferred core 133 can be a core 133 on which a VM virtual processor that handles the queue 139 is running. Thus, in certain examples, the new core 133 can be selected from cores 133 residing on the same L1 cache with either the preferred or current core 133. If no acceptable core 133 on the same L1 cache is acceptable, the new core 133 can be selected from cores 133 residing on the same L2 cache as the preferred or previous core 133. If still no acceptable core 133 is found, the new core 133 can be selected from cores 133 sharing L3 cache. If still no acceptable core 133 is found, all cores 133 on preferred non-uniform memory access ("NUMA") may be considered as the new core 133. Upon determination, the load balancer 130 can then re-affinitize the queue(s) 139 with one or more additional cores 133 in the network interface 136. As such, network processing loads of the cores 133 can be distributed to prevent or at least reduce the risk of the particular core 133 becoming a communication bottleneck.

In another embodiment, the load balancer 130 can also be configured to coalesce network processing loads of multiple queues 139 on a particular core 133. Thus, fewer number of cores 133 can be operating than before such coalescence. In one implementation, the load balancer 130 can be configured to compare the current utilization value of a core 133 with a low threshold (e.g., 15%, 20%, or other suitable values). If the current utilization value of the core 133 is lowered than the low threshold, the load balancer 130 can be configured to determine if another core 133 has capacity to assume responsibility for executing network processing loads carried by the core 133 without exceeding the high threshold (or other suitable thresholds). Upon determination, the load balancer 130 can be configured to re-affinitize any queue(s) 139 associated with the core 133 with the another core 133 in the network interface 136. As such, the core 133 can be shut down, enter a power save mode, or otherwise reduce power consumption. Example of operations of the load balancer 130 are described in more detail below with reference to FIGS. 3B and 3C.

The network interface 136 can be configured to facilitate virtual machines 144 and/or applications 147 executing on the host 106 to communicate with other components (e.g., other virtual machines 144 on other hosts 106) on the virtual networks 146 (FIG. 2). In FIGS. 3A-3F, hardware components are illustrated with solid lines while software components are illustrated in dashed lines. In certain embodiments, the network interface 136 can include one or more NICs. One suitable NIC for the network interface 136 can be a HP InfiniBand FDR/EN 10/40 Gb Dual Port 544FLR-QSFP Network Adapter provided by Hewlett-Packard of Palo Alto, California. In other embodiments, the network interface 136 can also include port adapters, connectors, or other suitable types of network components in addition to or in lieu of a NIC. Though only one NIC is shown in FIG. 3A as an example of the network interface 136, in further embodiments, the host 106 can include multiple NICs (not shown) of the same or different configurations to be operated in parallel or in other suitable manners.

As shown in FIG. 3A, the network interface 136 can include a controller 122, a memory 124, and one or more virtual ports 138 operatively coupled to one another. The controller 122 can include hardware electronic circuitry configured to receive and transmit data, serialize/de-serialize data, and/or perform other suitable functions to facilitate interfacing with other devices on the virtual networks 146. Suitable hardware electronic circuitry suitable for the controller 122 can include a microprocessor, an ASIC, a FPGA, or other suitable hardware components. Example modules for the controller 122 are described in more detail below. The memory 124 can include volatile and/or nonvolatile media (e.g., ROM; RAM, flash memory devices, and/or other suitable storage media) and/or other types of computer-readable storage media configured to store data received from, as well as transmitted to other components on the virtual networks 146.

The virtual ports 138 can be configured to interface with one or more software components executing on the host 106. For example, as shown in FIG. 3A, the network interface 136 can include two virtual ports 138 (identified as first and second virtual ports 138*a* and 138*b*, respectively) individually configured to interface with the first and second virtual machines 144*a* and 144*b* via the first and second virtual interfaces 145*a* and 145*b*, respectively. As such, communication flows to the first virtual machine 144*a* pass through the first virtual port 138*a* while communication flows to the second virtual machine 144*b* pass through the second virtual port 138*b*.

As shown in FIG. 3A, each of the virtual ports 138 can include multiple channels or queues 139 individually configured to handle one or more communication flows. In the illustrated embodiment in FIG. 3A, the first virtual port 138*a* includes three queues 139 (identified individually as first, second, and third queues 139a-139c, respectively). The second virtual port 138b includes two queues 139 (identified individually as first and second queues 139a' and 139b', respectively). In other embodiments, the first and/or second virtual ports 138 can include four, five, six, or any other suitable number of queues 139.

The individual queues 139 can be affinitized or associated with (as indicated by the arrows 135) one of the cores 133 for executing network processing operations for a communication flow through a corresponding queue 139. For example, in the illustrated embodiment, the first, second, and third queues 139a-139c in the first virtual port 138a are affinitized to the second core 133b. The first and second queues 139a' and 139b' of the second virtual port 138b are affinitized with the third and fourth cores 133c and 133d, respectively. In other embodiments, the foregoing queues 139 in the virtual ports 138 can be affinitized with other cores 133 in any suitable manners. In further embodiments, the foregoing affinitization or association between the individual queues 139 and the cores 133 can be dynamically adjusted by, for example, by the load balancer 130, as described in more detail later.

As shown in FIG. 3A, the controller 122 can include a media access unit ("MAU") 123, a packet handler 125, a port selector 126, an affinity agent 127, and a RSS engine 128 operatively coupled to one another. Though particular components are shown in FIG. 3A, in other embodiments, the controller 122 can also include direct memory access interface and/or other suitable components. The MAU 123 can be configured to interface with a transmission medium of the underlay network 108 (FIG. 1) to receive and/or transmit data, for example, as packets 150 having a header, a payload, and optionally a trailer. In one embodiment, the MAU 123 can include an Ethernet transceiver. In other embodiments, the MAU 123 can also include a fiber optic transceiver or other suitable types of media interfacing components.

The packet handler 125 can be configured to facilitate operations related to receiving and transmission of packets 150. For example, in certain embodiments, the packet handler 125 can include a receive de-serializer, a CRC generator/checker, a transmit serializer, an address recognition module, a first-in-first-out control module, and a protocol control module. In other embodiments, the packet handler 125 can also include other suitable modules in addition to or in lieu of the foregoing modules. As described in more detail below, the packet handler 125 can also cooperate with the port selector 126 and the RSS engine 128 to process and forward packets 150 to the virtual machines 144 and/or the application 147.

The affinity agent 127 can be configured to modify affinitization between the queues 139 and the cores 133 on the network interface 136. The affinity agent 127 can be configured to provide to the processor 132, or an operating system (not shown) executing on the processor 132 a default affinitization between the queues 139 and the cores 133. The affinity agent 127 can also be configured to indicate to the processor 132 or the operating system that the default affinitization can be modified via, for example, an application programming interface ("API") or other suitable types of hardware/software interface. In response to suitable instructions, the affinity agent 127 can be configured to modify, reset, or otherwise adjust affinitization between the queues 139 and the cores 133. Certain examples of such modification are described below with reference to FIGS. 3B-3F.

In accordance with embodiments of the disclosed technology, the network interface 136 can be implemented with two-stage network processing load balance by utilizing the port selector 126 as a first stage and the RSS engine 128 as a second stage implemented in the hardware electronic circuitry of the controller 122. The port selector 126 can be configured to distribute incoming packets 150 to a particular virtual port 138 of the network interface 136 by identifying a general destination of the incoming packets 150 (e.g., a virtual machine 144). For example, the port selector 126 can be configured to filter the incoming packets 150 based on a media access control address ("MAC" address) included in headers of the packets 150. The filtered packets 150 associated with a particular MAC address are then assigned to a virtual port 138 associated with a virtual machine 144 on the host 106. For instance, as shown in FIG. 3A, the port selector 126 can identify that the incoming packets 150 and 150' are destined to the first virtual machine 144a based on a MAC address contained in headers of the packets 150 and 150'. In response, the port selector 126 can assign the packets 150 and 150' temporarily held in the memory 124 to the first virtual port 138a, as indicated by the arrow 137. In other implementations, the port selector 126 can be configured to filter the incoming packets 150 and 150' based on a virtual machine identifier, a virtual machine IP address, or other suitable identifiers. Example implementations of the port selector 126 are described below with reference to FIG. 5.

As shown in FIG. 3B, the RSS engine 128 can be configured to further distribute the incoming packets 150 and 150' assigned to a virtual port 138 to a particular queue 139 in the virtual port 138 based on a particular destination of the packets 150 and 150' (e.g., the application 147 executing on the virtual machine 144). For example, the RSS engine 128 can be configured to calculate a hash value (e.g., 32 bits) based on a source IP address, a destination IP address, a source port, a destination port, and/or other suitable Transmission Control Protocol ("TCP") parameters (referred to as "characteristic of communication") included in the headers of the packets 150 and 150'. An example header structure suitable for the packets 150 and 150' is described below with reference to FIG. 4.

Upon identifying the particular destination, the RSS engine 128 can then assign the packets 150 and 150' to one or more queues 139 in the virtual port 138 based on one or more bits of the calculated hash value by consulting an indirection table associated with the virtual port 138. The indirection table can be contained in the memory 124, a persistent storage (not shown), or in other suitable locations of the network interface 136. The indirection table can contain assignments or otherwise indicate the affinitized cores 133 with the individual queues 139 based on the one or more bits of the hash value. The following is an example indirection table for the illustrated example of the first virtual port 138a in FIG. 3B using two bits from the calculated hash value:

| Bit value | Queue Number | Core Number |
|-----------|--------------|-------------|
| 00        | 1            | 2           |
| 01        | 2            | 2           |
| 10        | 3            | 2           |

In the illustrated example, the RSS engine 128 selects the second queue 139b (shown in reverse contrast) for the packets 150 and selects the third queue 139c for the packets 150' based on the characteristic of communication of the packets 150 and 150'. In other examples, the RSS engine 128 can select another suitable queue 139 in the first virtual port 138a. As shown in FIG. 3B, both the identified second and third queues 139b and 139c are affinitized with the second core 133b (also shown in reverse contrast). As such, the second core 133b is tasked with executing network processing loads for both the packets 150 and 150' in the second and third queues 139b and 139c. Example implementations of the RSS engine 128 are described below with reference to FIG. 6.

With the identified queue/core 139/133, the packet handler 125 of the network interface 136 can then cooperate with the identified second core 133b to forward the packets 150 and 150' to the particular destination on the host 106. In certain implementations, the packet handler 125 can detect that a certain amount of data (e.g., a number of packets 150 and 150') have been received in the second and third queues 139b and 139c, respectively. In response, the packet handler 125 can generate an interrupt to the processor 132 (and/or an operation system executing by the processor 132) to schedule a remote procedure call on the second core 133b. Once the scheduled remote procedure call executes on the second core 133b, the second core 133b can inspect and retrieve any packets 150 and 150' from the second and third queues 139b and 139c, perform suitable processing on the retrieved packets 150 and 150', and forward the processed packets 150 and 150' to the virtual machine 144 associated with the virtual port 138, e.g., the first virtual machine 144a in FIG. 3B. The first virtual machine 144a can then forward the received packets 150 and 150' to the first and second applications 147a and 147b, respectively, for further processing. In other implementations, the packet handler 125 can initiate the network processing operations by the second core 133b in other suitable manners.

In operation, the MAU 123 receives the packets 150 and 150' via the underlay network 108 (FIG. 1) and temporarily stores a copy of the received packets 150 and 150' in the memory 124 in cooperation with the packet handler 125. The port selector 126 can then inspect a portion of the headers of the packets 150 and 150' for a general destination of the packets 150 and 150' by identifying, for example, a MAC address corresponding to one of the virtual machines 144. Based on the identified general destination, the port selector 126 can assign the packets 150 and 150' to a virtual port 138, e.g., the first virtual port 138a. Once assigned to a virtual port 138, the RSS engine 128 can then select one of the queues 139 in the virtual port 138 for handling the packets 150 and 150' based on, for example, a communication characteristic of the packets 150 and 150'. Upon detecting that a certain number of packets 150 and 150' are in the assigned queue 139, the packet handler 125 can then generate and transmit an interrupt to the processor 132 to schedule and/or initiate the network processing operations associated with the packets 150 and 150'.

During operation, the second core 133b can be overloaded with execution of network processing loads for processing the packets 150 and 150' from both the second and third queues 139b and 139c. For example, as shown in FIG. 3B, the second core 133b can have a utilization percentage 149 that exceeds a high threshold (e.g., 90% or 95%). Under such operating conditions, the second core 133b can become a communication bottleneck for processing packets 150 and 150' in the second and third queues 139b and 139c.

In accordance with embodiments of the disclosed technology, the load balancer 130 can monitor for such conditions and further distribute network processing loads to additional cores 133. In certain embodiments, the load balancer 130 can monitor utilization percentage and/or other operating parameters of the individual cores 133, for example, via a debug port on the uncore or other suitable interfaces of the processor 132. In other embodiments, the load balancer 130 can receive a notification from the processor 132. The notification can indicate to the load balancer 130 that a utilization percentage of the second core 133b exceeds a threshold (e.g., 75%) and a current value of the utilization percentage. In further embodiments, the load balancer 130 can monitor operating parameters of the cores 133 in other suitable manners.

Based on the received information, the load balancer 130 can calculate an overall utilization for each core 133, a total time spent in executing network processing loads for each queue 139, a total number of packets processed for each queue 139, and/or other suitable operating values. Using such received and/or calculated operating parameters/values, the load balancer 130 can determine whether any of the cores 133 is overloaded and thus susceptible to become a communication bottleneck. As such, in the example illustrated in FIG. 3B, the load balancer 130 can determine that the second core 133b is overloaded by having a utilization percentage exceeding a high threshold.

Upon such a determination, the load balancer 130 can then determine (i) which queue(s) 139 (or associated communication flows) can be relocated from the second core 133b; and (ii) if another core 133 has capacity to assume responsibility for executing network processing loads associated with the second and third queues 139b and 139c. In certain embodiments, the load balancer 130 can select a queue 139 with the lowest or highest network processing loads to be relocated. In other embodiments, the load balancer 130 can select a queue 139 to relocate based on other suitable criteria. The load balancer 130 can also select another core 133 as a destination for relocating the queue 139 based on various conditions. For example, the load balancer 130 can select a currently idle core 133 (e.g., with a utilization percentage lower than a preset threshold) as the destination. In other examples, the load balancer 130 can select another core 133 by default or based on other suitable conditions.

Once selected, the load balancer 130 can transmit a modification command 190 to the network interface 136 for modifying affinitization between a queue 139 and a core 133. For example, as shown in FIG. 3B, the modification command 190 can instruct the affinity agent 127 to change affinitization of the third queue 139c of the first virtual port 138a from the second core 133b to the third core 133c. In response, the affinity agent 127 can modify the indirection table accordingly. Thus, the example indirection table related to the first virtual port 138a discussed above would be modified as follows:

| Bit value | Queue Number | Core Number |
| --- | --- | --- |
| 00 | 1 | 2 |
| 01 | 2 | 2 |
| 10 | 3 | 3 |

As such, the third queue 139c is now affinitized with the third core 133c to execute network processing loads for the third queue 139c. As shown in FIG. 3C, by relocating the network processing loads of the third queue 139c from the second core 133b to the third core 133c, the utilization percentages 149 and 149' of both the second and third cores 133b and 133c can be lower than the high threshold, and thus preventing these cores 133 to become communication bottlenecks.

Even though one communication flow is relocated in FIGS. 3A-3C to illustrate redistribution of execution of network processing loads, in other embodiments, the load balancer 130 can also redistribute additional communication flows from the second core 133b based on a target utilization percentage (or other suitable operation parameters). For example, the load balancer 130 can iterative relocate communication flows from the second core 133b until a utilization percentage of the second core 133b is below a target threshold. In other examples, the load balancer 130 can perform such redistribution in other suitable manners.

Figure 3E:
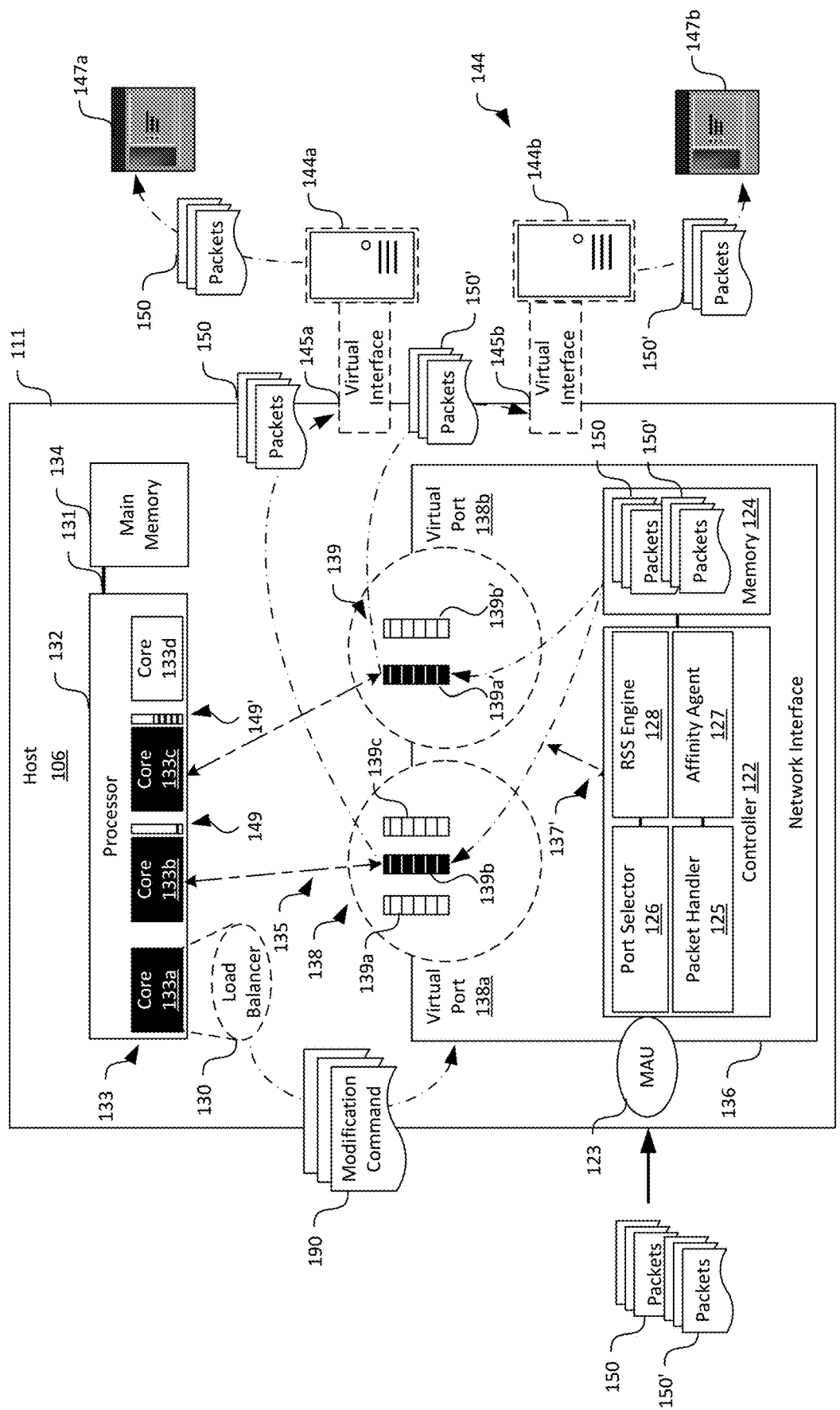

FIGS. 3C-3F illustrate operational stages related to coalescing network processing loads to one or a reduced number of cores 133 for multiple communication flows. As shown in FIG. 3C, the port selector 126 can distribute the packets 150 and 150' to different virtual ports 138 based on, for instance, MAC addresses included in the headers of the packets 150 and 150'. In the illustrated example, the packets 150 is assigned to the first virtual port 138a while the packets 150' are assigned to the second virtual port 138b. As shown in FIG. 3E, the RSS engine 128 can the select one of the queues 139 for receiving the packets 150 and 150'. In the illustrated example, the third queue 139b of the first virtual port 138a is selected to receive the packets 150. The first queue 139a' of the second virtual port 138b is selected to receive the packets 150'.

As shown in FIG. 3C, the third queue 139b of the first virtual port 138a and the first queue 139a' of the second virtual port 138b are affinitized with the second and third cores 133b and 133c, respectively. As such, the second and third cores 133b and 133c can execute network processing loads to facilitate processing of the packets 150 and 150' from the third queue 139b of the first virtual port 138a and the first queue 139a' of the second virtual port 138b, respectively. During operation, the load balancer 130 can determine that a utilization percentage 149' of the second core 133b falls below a low threshold (e.g., 15%) when executing network processing loads for the packets 150. In response, the load balancer 130 can determine that the third core 133c can accommodate network processing loads of the packets 150 without exceeding a utilization threshold (e.g., the high threshold discussed above or other suitable thresholds).

Figure 3F:
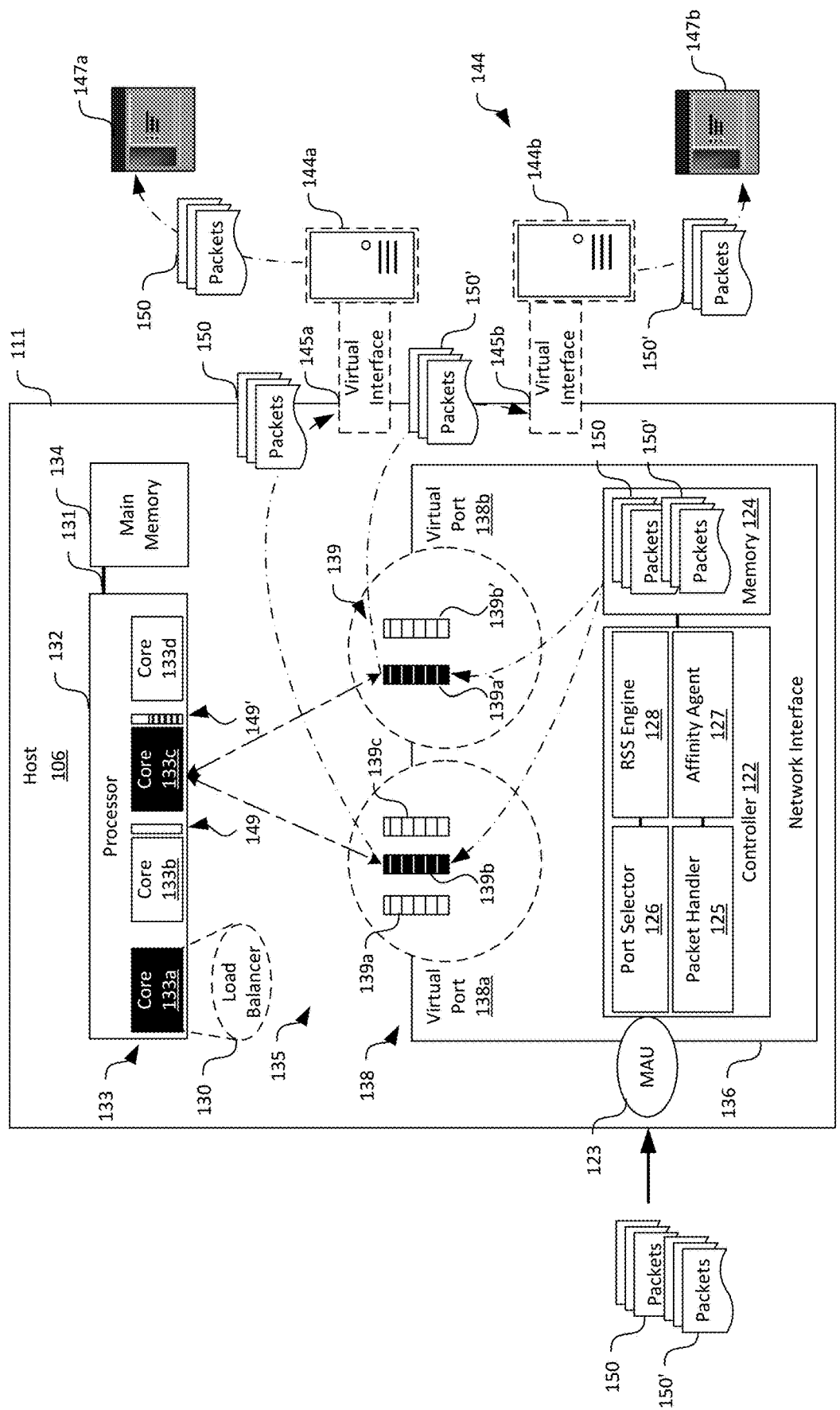

The load balancer 130 can then issue a modification command 190 instructing the affinity agent 127 to modify the indirection table such that the second queue 139b of the first virtual port 138a is affinitized with the third core 133c. As shown in FIG. 3F, the third core 133c can then execute network processing loads for processing the packets 150 and 150' from both the second queue 139b of the first virtual port 138a and the first queue 139a' from the second virtual port 138b. Thus, the second core 133b can be shut down, enter a power save or other suitable modes to reduce power consumption.

Even though two communication flows are used in FIGS. 3C-3F to illustrate coalescence of execution of network processing loads, in other embodiments, the load balancer 130 can also coalesce additional communication flows from other queues 139 such that a minimum or target number of cores 133 are used to execute suitable network processing loads for the packets in any queues 139. The load balancer 130 can perform such coalescence in series, in batch, or in other suitable manners.

Several embodiments of the disclosed technology can improve network data throughput to applications 147, virtual machines 144, or other software components on a host 106 when compared to other communication techniques. In certain computing systems, RSS operations can be implemented as a software component, for example, a module of an operating system executed by a core on the server. However, using a generic main processor for performing RSS operations such as hash calculations can be highly inefficient. For instance, in one test, a server having software implemented RSS engine could only achieve about 26 Gbit/s of network data transmission when the NIC has a capacity of 40 Gbit/s. The software implemented RSS engine can also suffer from performance jitters or variances when the core experiences operational delays and other undesirable effects. By offloading execution of RSS operations to the hardware implemented RSS engine 128 in the network interface 136, data throughput in the host 106 can be significantly improved. For instance, in another test, a server having a hardware implemented RSS engine 128 achieved close to 40 Gbit/s of network data transmission when the NIC has a capacity of 40 Gbit/s.

Figure 4:
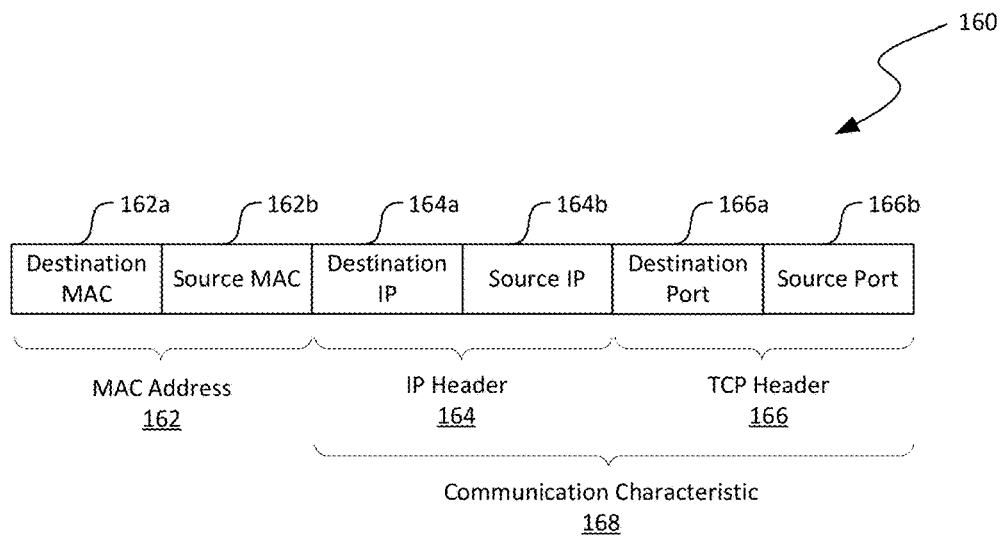
FIG. 4 is an example data schema suitable for a header of a packet in accordance with embodiments of the present technology.

FIG. 4 is an example data schema suitable for a header 160 of a packet in accordance with embodiments of the present technology. In addition to the header 160, the packet can also include a payload and a trailer (not shown). As shown in FIG. 4, the header 160 can include MAC addresses 162 (i.e., destination MAC 162a and source MAC 162b), an IP header 164 (i.e., destination IP address 164a and source IP address 164b), and a TCP header 166 (i.e., destination port 166a and source port 166b). In certain embodiments, the combination of the IP header 164 and the TCP header 166 is referred to as a characteristic of communication 168 of a packet associated with the header 160. In other embodiments, other header fields (not shown) can also be a part of the characteristic of communication 168 in addition to or in lieu of the IP header 164 and the TCP header 166.

Figure 5:
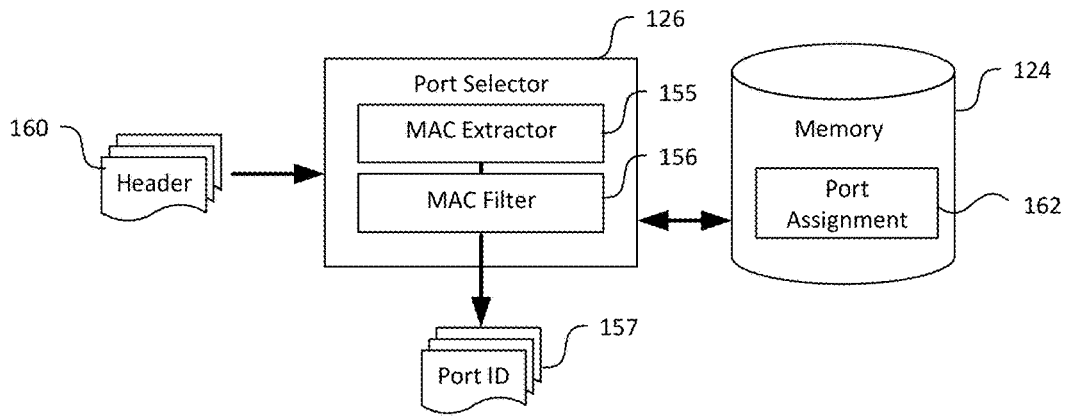
FIG. 5 is a block diagram showing hardware modules suitable for the port selector of FIGS. 3A-3F in accordance with embodiments of the present technology.

FIG. 5 is a block diagram showing example hardware modules suitable for the port selector 126 of FIGS. 3A-3F in accordance with embodiments of the present technology. As shown in FIG. 5, the port selector 126 can include a MAC extractor 155 and a MAC filter 156 operatively coupled to one another. The MAC extractor 155 can be configured to extract or otherwise identify a MAC address (e.g., a destination MAC address) included in a header 160 of a packet. Once identified, the MAC extractor 155 can be configured to forward the identified MAC address to the MAC filter 156 for further processing.

The MAC filter 156 can be configured to identify a virtual port ID 157 based on the MAC address received from the MAC extractor 155. In the illustrated embodiment, the MAC filter 156 can identify the virtual port ID 157 by comparing the received MAC address to records of port assignment 162 contained in the memory 124. In certain embodiments, the port assignment 162 can include a table with entries listing a virtual port ID with a corresponding MAC address, a default virtual port ID, or other suitable information. In other embodiments, the port assignment 162 can include an index, a state machine, or other suitable data structures.

Figure 6:
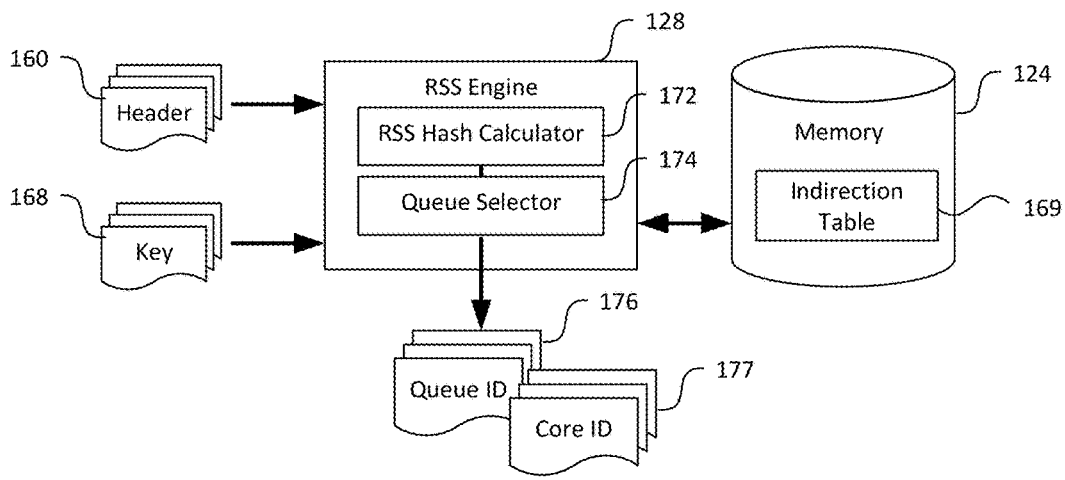
FIG. 6 is a block diagram showing hardware modules suitable for the RSS engine of FIGS. 3A-3F in accordance with embodiments of the present technology.

FIG. 6 is a block diagram showing example hardware modules suitable for the RSS engine 128 of FIGS. 3A-3F in accordance with embodiments of the present technology. As shown in FIG. 6, the RSS engine 128 can include a RSS hash calculator 172 and a queue selector 174 operatively coupled to one another. The RSS hash calculator 172 can be configured to calculate a hash value based on a characteristic of communication 168 (FIG. 4) of the header 160 and a key 168. The key 168 can include a random number or other suitable number unique to the RSS engine 128. Various hash heuristics can be used for calculating the hash value. Example hash heuristics can include perfect hashing, minimal perfect hashing, hashing variable length data, or other suitable hashing functions. The RSS hash calculator 172 can then forward the calculated hash vale to the queue selector 174 for further processing. The queue selector 174 can be configured to identify a queue in a virtual port and affinitized core based on the calculated hash value or a portion thereof. For example, the queue selector 174 can compare two least significant bits of a calculated hash value to those included in an indirection table 169 and identify a corresponding queue/core ID 176 and 177. In other examples, the queue selector 174 can also use the hash value or a portion thereof as the queue/core ID or identify the queue/core ID in other suitable manners.

Figure 7:
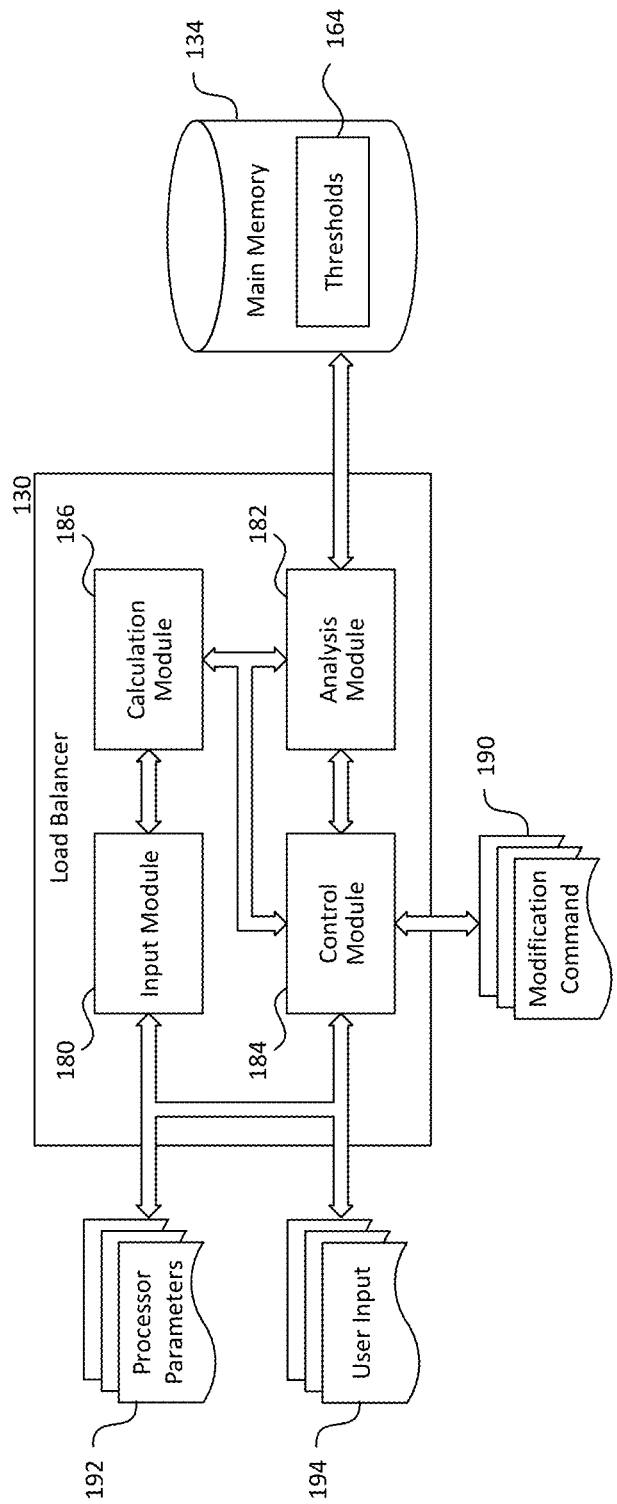
FIG. 7 is a block diagram showing software modules suitable for the load balancer of FIGS. 3A-3F in accordance with embodiments of the present technology.

FIG. 7 is a block diagram showing certain computing modules suitable for the load balancer 130 in FIGS. 3A-3F in accordance with embodiments of the disclosed technology. As shown in FIG. 7, the load balancer 130 include an input module 180, a calculation module 186, a control module 184, and an analysis module 182 interconnected with one another. The input module 160 can be configured to receive processor parameters 192 by accessing debug information from the processor 132 (FIG. 2) or via a debug port and via other suitable interfaces. The processor parameters 192 can include core utilization percentage, core active time, core execution task identification, or others suitable parameters. The input module 180 can also be configured to receive user input 194 such as a high threshold, a low threshold, or other suitable information from an administrator, a user, or other suitable entities. The input module 180 can then provide the received processor parameters 192 and the user input 194 to the analysis module 182 for further processing.

The calculation module 186 can include routines configured to perform various types of calculations to facilitate operation of other components of the load balancer 130. For example, the calculation module 186 can include routines for accumulating a total time and a total number of packets a core 133 (FIGS. 3A-3F) is used for executing network processing loads of individual queues 139 (FIGS. 3A-3F). In another example, the calculation module 186 can be configured to calculate an overall utilization of each cores 133. In other examples, the calculation module 186 can include linear regression, polynomial regression, interpolation, extrapolation, and/or other suitable subroutines. In further examples, the calculation module 186 can also include counters, timers, and/or other suitable routines.

The analysis module 182 can be configured to analyze the various received and/or calculated processor parameters to determine whether a utilization level of a core is higher than a high threshold or lower than a low threshold. For example, the analysis module 182 can compare a utilization percentage of a core to the high threshold and to the low threshold. The analysis module 182 can then indicate whether the core is likely overloaded or underutilized according results of analysis. The control module 184 can be configured to control issuance of modification commands 190 according to the analysis results from the analysis module 182. In certain embodiments, the control module 184 can be configured to issue the modification command 190 to relocate a queue from an original core to another core. In other embodiments, the control module 184 can be configured to coalesce network processing loads from multiple cores to one or a reduced number of cores. Additional functions of the various components of the load balancer 130 are described in more detail below with reference to FIGS. 8C and 8D.

FIGS. 8A-8D are flow diagrams illustrating various aspects of processes for managing network traffic in a host in accordance with embodiments of the present technology. Even though the processes are described below with reference to the computing system 100 of FIGS. 1 and 2, in other embodiments, the processes can be implemented in computing systems with additional and/or different components.

Figure 8A:
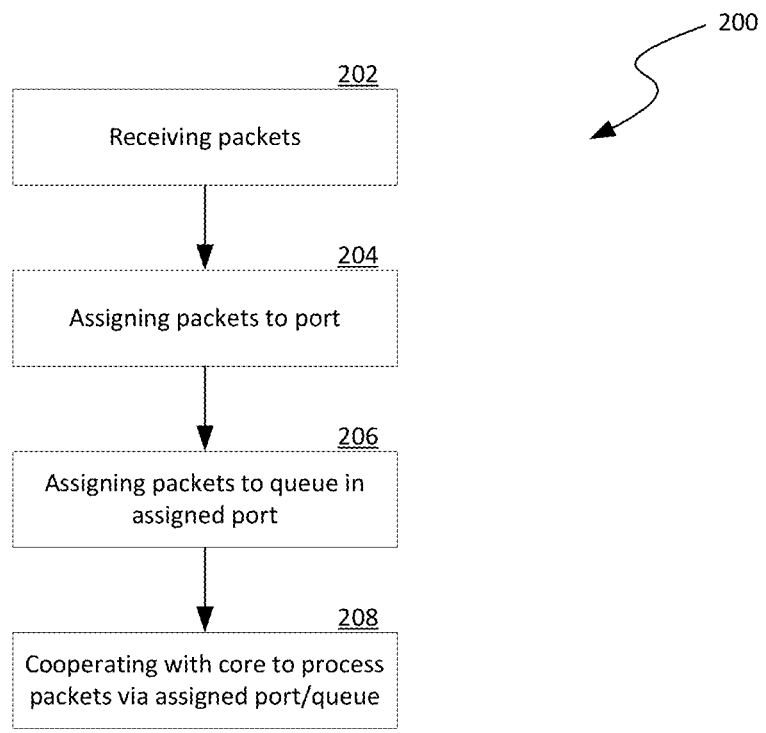
FIGS. 8A-8D are flow diagrams illustrating aspects of processes for network processing resource management in a host in accordance with embodiments of the present technology.

As shown in FIG. 8A, the process 200 can include receiving packets at a network interface via a computer network at stage 202. The packets can include headers such as that shown in FIG. 4. The process 200 can then include assigning the received packets to a virtual port of the network interface at stage 204. In certain embodiments, the received packets are assigned in accordance with a destination MAC address included in the header of the packets. In other embodiments, the received packets can be assigned based on a virtual machine address or other suitable destination identifiers.

The process 200 can then include assigning packets in a virtual port of the network interface to a particular queue of the virtual port at stage 206. In certain embodiments, the packets are assigned to a particular queue based on a characteristic of communication of the packets. The characteristic of communication can include, for instance, a source IP address, a destination IP address, a source port, a destination port, and/or other suitable TCP parameters. In other embodiments, the packets can be assigned based on other suitable parameters or characteristics of the packets. In accordance with embodiments of the disclosed technology, each of the queues can be affinitized to a core of a main processor in a host. As such, once the packets are assigned to a queue, a corresponding core can be identified. The process 200 can then include cooperating with the core corresponding to the assigned queue to process and forward the packets to the particular destination in the general destination at stage 208. An example operation for such processing is described above with reference to FIGS. 3A-3F.

Figure 8B:
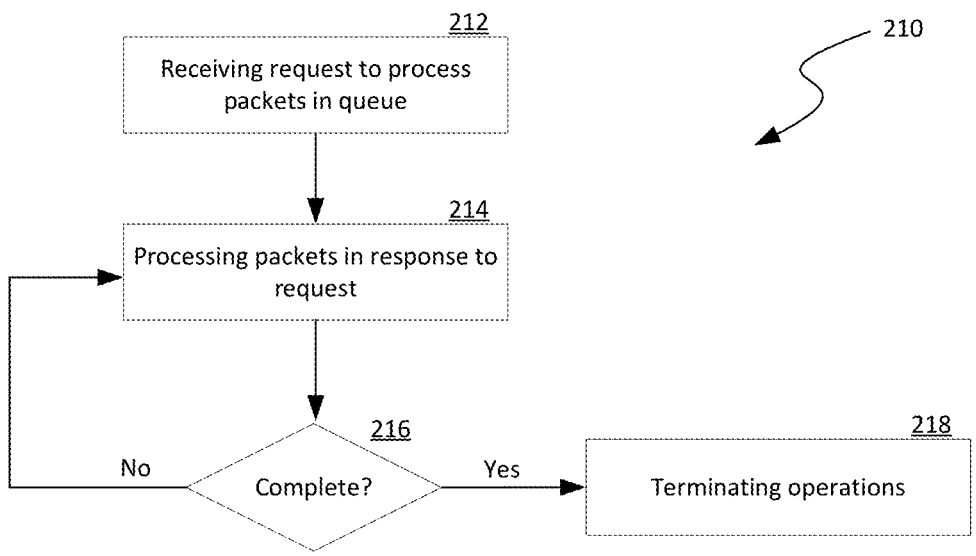

As shown in FIG. 8B, the process 210 can include receiving a request to process packets in a queue of a virtual port of a network interface at stage 212. In certain embodiments, the packets in the queue can be destined to an application executing in a virtual machine hosted on a server. In other embodiments, the packets in the queue can be destined to the virtual machine, a hypervisor for the virtual machine, or other suitable software components on the server. The process 210 can then include processing packets in the queue in response to the request at stage 214. In certain embodiments, processing the packets can include inspecting and retrieving the packets from the queue and executing one or more of enforcing communications security, performing network virtualization, translating network addresses, or maintaining a communication flow state with a core corresponding to the queue. In other embodiments, processing the packets can include performing other suitable functions with the core corresponding to the queue.

The process 210 can then include a decision stage 216 to determine whether the process 210 is complete. In one embodiment, the process 210 is complete when the queue contains no more packets. In other embodiments, the process 210 is complete when a user terminates the process 210 or under other suitable conditions. In response to determining that the process 210 is complete, the process 210 includes terminating operations at stage 218; otherwise, the process 210 reverts to processing additional packets at stage 214.

Figure 8C:
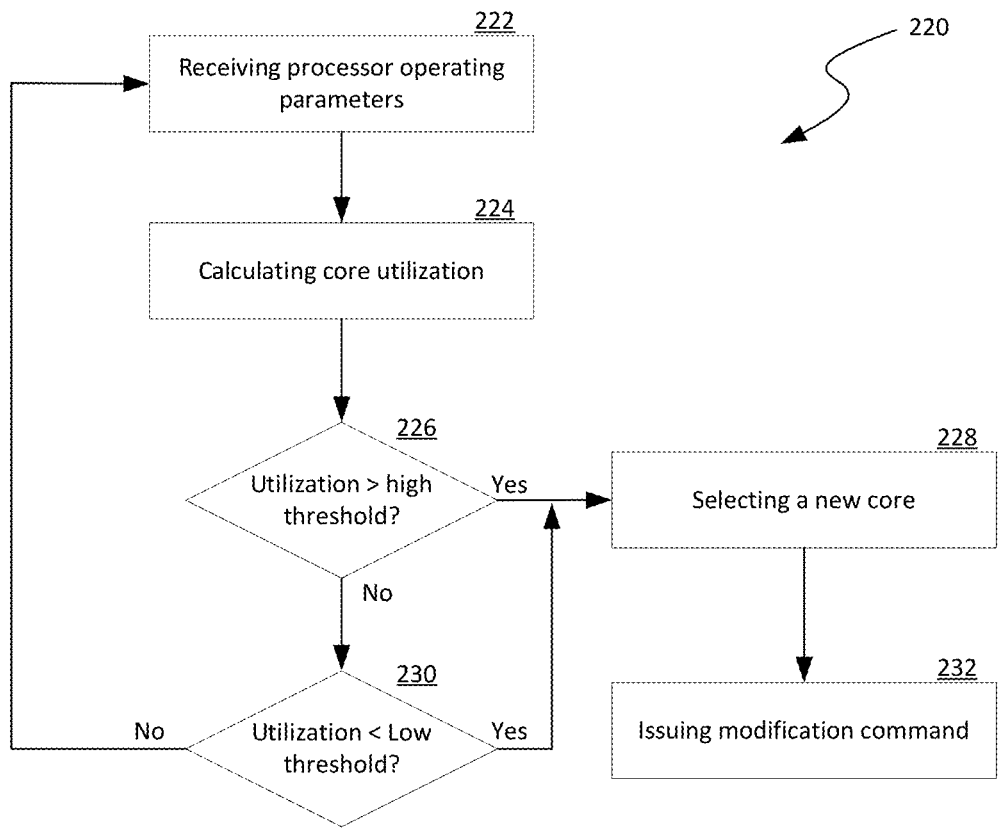

As shown in FIG. 8C, the process 220 can include receiving processor or core operating parameters at stage 222. The process 220 can then include calculating core utilization for executing network processing loads of various queues at stage 224. The process 220 can then include a decision stage 226 to determine whether utilization of a core is greater than a high threshold. In response to determining that the utilization of the core is greater than the high threshold, the process 220 can include selecting a new core for relocating one or more queues from the core at stage 228. The process 220 can then include issuing a modification command to, for example, the network interface 136 in FIGS. 3A-3F to modify affinitization between queues and cores such that the one or more queues are "moved" from the core to the new core at stage 232.

In response to determining that the utilization of the core is not greater than the high threshold, the process 220 can include another decision stage 230 to determine whether the utilization of the core is lower than a lower threshold. In response to determining that the utilization of core is lower than the low threshold, the process 220 can include selecting a new core at stage 228 to relocate queues currently affinitized with the core. In response to determining that the utilization of core is not lower than the low threshold, the process 220 reverts to receiving additional processor operating parameters at stage 222.

Figure 8D:
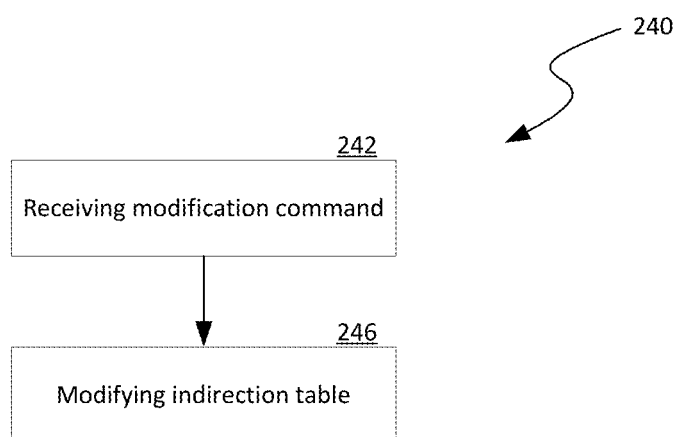

As shown in FIG. 8D, the process 240 can include receiving a modification command at stage 242. The modification command includes instructions to modify affinitization between a queue in a virtual port of a network interface with a core of a main processor. The process 240 can further include modifying an indirection table to effect the modification included in the modification command at stage 246.

FIG. 9 is a computing device 300 suitable for certain components of the computing system 100 in FIG. 1, for example, the host 106 or the client device 103. In a very basic configuration 302, the computing device 300 can include one or more processors 304 and a system memory 306. A memory bus 308 can be used for communicating between processor 304 and system memory 306. Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. As shown in FIG. 8, the operating system 320 can include a hypervisor 140 for managing one or more virtual machines 144. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for network traffic management in a computing device having a network interface controller operatively coupled to a main processor with multiple cores, the method comprising:
   in response to receiving, at the network interface controller, packets associated with a communication flow, assigning, at the network interface controller, the received packets (i) to a virtual port of the network interface controller, the virtual port having multiple queues and (ii) to one of the multiple queues in the virtual port based on parameters of the communication flow, the one of the multiple queues being affinitized with a first core of the main processor; and
   while the first core is executing network processing operations related to the packets assigned to the one of the multiple queues of the virtual port,
      receiving, at the network interface controller from the main processor, a command to affinitize the one of the multiple queues with a second core of the main processor instead of the first core, wherein the command is issued in response to determining that the first core has a utilization level lower than a threshold indicative of a low utilization level, and that the second core has a current utilization level that is higher than the threshold and lower than another threshold indicative of a high utilization level; and
      in response to the received command,
         modifying an entry in a table on the network interface controller to indicate that the one of the multiple queues is affinitized with the second core instead of the first core.

2. The method of claim 1 wherein the virtual port of the network interface controller corresponds to a virtual machine or a hypervisor executing on the computing device.

3. The method of claim 1 wherein assigning the packets to the one of the multiple queues includes:
   calculating, at the network interface controller, a hash value of one or more of a source IP address, a destination IP address, a source port, or a destination port associated with the assigned packet; and
   identifying the one of the multiple queues as one corresponding to at least a portion of the calculated hash value in the table contained in the network interface controller.

4. The method of claim 1 wherein assigning the packets to the virtual port includes:
   extracting a destination MAC address from a header of the packets, the destination MAC address identifies a virtual machine executing on the computing device; and
   identifying the virtual port corresponding to the extracted MAC address and to the virtual machine.

5. The method of claim 1 wherein:
   the virtual port corresponds to a virtual machine executing on the computing device; and
   the one of the multiple queues corresponds to an application executing in the virtual machine.

6. The method of claim 1 wherein:
   the virtual port corresponds to a virtual machine executing on the computing device;
   the one of the multiple queues corresponds to an application executing in the virtual machine; and
   causing the second core includes causing the second core to enforce communications security, perform network virtualization, translate network addresses, or maintain a communication flow state to forward the remaining portion of the packets in the one of the multiple queues to the application executing in the virtual machine.

7. The method of claim 1 wherein:
   the packets are a first set of packets having a first header containing a first MAC address; and
   the method further includes:
      receiving, at the network interface controller, a second set of packets having a second header containing a second MAC address that is the same as the first MAC address; and
      assigning, at the network interface controller, the received second set of packets to the same virtual port of the network interface controller based on that the second MAC address is the same as the first MAC address.

8. The method of claim 1 wherein:
   the packets are a first set of packets having a first header containing a first MAC address;
   the virtual port is a first virtual port; and
   the method further includes:
      receiving, at the network interface controller, a second set of packets having a second header containing a second MAC address that is different than the first MAC address; and
      assigning, at the network interface controller, the received second set of packets to a second virtual port of the network interface controller, the second MAC address being different than the first MAC address.

9. The method of claim 1 wherein:
   the packets are a first set of packets having a first header containing a first MAC address and a first destination IP address;
   the one of the multiple queues is a first queue; and
   the method further includes:
      receiving, at the network interface controller, a second set of packets having a second header containing a second MAC address that is the same as the first MAC address but a second destination IP address different than the first destination IP address;
      assigning, at the network interface controller, the received second set of packets to the same virtual port of the network interface controller based on that the second MAC address is the same as the first MAC address; and assigning, at the network interface controller, the second set of packets to a second queue in the same virtual port, the second queue being different than the first queue.

10. A computing device, comprising:
a main processor having multiple cores configured to execute instructions independently;
a network interface controller operatively coupled to the main processor, the network interface controller having one or more virtual ports each having one or more queues configured to receive and temporarily store packets, wherein each of the queues is affinitized with one of the cores of the main processor; and
a memory containing instructions executable by the main processor to cause the main processor to:
 receive, at the main processor, a request from the network interface controller to perform network processing operations for packets in a queue of a virtual port of the network interface controller, the packets belonging to a single communication flow;
 in response to receiving the request, perform the network processing operations at a first core with which the queue of the virtual port is affinitized to effect processing and transmission of the packets;
 while performing the network processing operations with the first core, determine whether the first core has a utilization level higher than a threshold; and
 in response to a determination that the utilization level of the first core is higher than the threshold:
  switch processing and transmission of a remaining portion of the packets from the first core to a second one of the cores of the main processor based on a current utilization level of the second core being lower than the threshold and higher than another threshold; and
  affinitize the queue of the virtual port with the second core.

11. The computing device of claim 10 wherein the request includes a hardware interrupt from the network interface controller to the main processor.

12. The computing device of claim 10 wherein:
the request includes a hardware interrupt from the network interface controller to the main processor; and
to perform the network processing operations includes to schedule a remote procedure call on the first core and to cause the first core to execute the scheduled remote procedure call to enforce communications security, to perform network virtualization, to translate network addresses, or to maintain a communication flow state.

13. The computing device of claim 10 wherein the instructions are executable by the main processor to cause the main processor to:
receive, at the main processor, another request from the network interface controller to perform additional network processing operations for the remaining portion of the packets in the queue of the virtual port of the network interface controller; and
in response to receiving the another request, perform the network processing operations at the second core to effect processing and transmission of the remaining portion of the packets to an application executing in a virtual machine hosted on the computing device.

14. The computing device of claim 10 wherein:
the threshold is a first threshold; and
the instructions are executable by the main processor to cause the main processor to:
 in response to another determination that the utilization level of the first core is not higher than the first threshold,
  determine whether the utilization level of the first core is lower than a second threshold when performing the network processing operations to effect processing and transmission of the packets, the second threshold being lower than the first threshold; and
 in response to another determination that the utilization level of the first core is lower than the second threshold, switch processing and transmission of the remaining portion of the packets to a third core having a utilization level higher than the second threshold but lower than the first threshold.

15. The computing device of claim 10 wherein:
the threshold is a first threshold; and
the instructions are executable by the main processor to cause the main processor to:
 in response to another determination that the utilization level of the first core is higher than the threshold,
  determine whether the utilization level of the first core is lower than a second threshold when performing the network processing operations to effect processing and transmission of the packets, the second threshold being lower than the first threshold; and
 in response to another determination that the utilization level of the first core is lower than the second threshold,
  switch processing and transmission of a remaining portion of the packets from the first core to a third one of the cores; and
  perform additional network processing operations at the third core to effect processing and transmission of the remaining portion of the packets to an application executing in a virtual machine hosted on the computing device.

16. A method for network traffic management in a computing device having a network interface controller operatively coupled to a main processor with multiple cores, the network interface controller having one or more virtual port individually having one or more queues configured to receive and temporarily store packets, wherein the method comprising:
receiving, at the main processor, a request from the network interface controller to perform network processing operations at a first core of the main processor for packets assigned by the network interface controller to a queue of a virtual port of the network interface controller;
in response to receiving the request, perform the network processing operations with the first core with which the queue of the virtual port is affinitized to effect processing and transmission of the packets;
determining whether the first core has a utilization level lower than a threshold when performing the network processing operations to effect processing and transmission of the packets; and
in response to a determination that the first core has a utilization level lower than the threshold, switch processing and transmission of a remaining portion of the packets in the queue from the first core to a second core of the main processor based on a current utilization level of the second core being higher than the threshold and lower than another threshold.

17. The method of claim 16 wherein:

receiving, at the main processor, another request from the network interface controller to perform additional network processing operations at the second core of the main processor for another portion of the packets in the queue of the virtual port of the network interface controller; and in response to receiving the another request, performing the additional network processing operations at the second core to effect processing and transmission of the another portion of the packets to an application executing in a virtual machine hosted on the computing device.

18. The method of claim 16 wherein:

the threshold is a first threshold; and the method further includes:

in response to another determination that the utilization level of the first core is higher than the first threshold, determining whether the utilization level of the first core is lower than a second threshold when performing the network processing operations to effect processing and transmission of the packets, the second threshold being lower than the first threshold; and in response to a further determination that the utilization level of the first core is not lower than the second threshold, switching processing of the remaining portion of the packets from the first core to a third core having a utilization level lower than the second threshold.

19. The method of claim 16 wherein:

the threshold is a first threshold; and the method further includes:

in response to another determination that the utilization level of the first core is higher than the first threshold, determining whether the utilization level of the first core is lower than a second threshold when performing the network processing operations to effect processing and transmission of the packets, the second threshold being lower than the first threshold; and in response to a further determination that the utilization level of the first core is lower than the second threshold, continuing processing and transmission of the remaining portion of the packets using the first core.

* * * * *